(12) United States Patent
Schoof et al.

(10) Patent No.: US 12,393,930 B2
(45) Date of Patent: Aug. 19, 2025

(54) CRYPTOCURRENCY ACCESS MANAGEMENT

(71) Applicant: Block, Inc., Oakland, CA (US)

(72) Inventors: Alexander Schoof, Leesburg, VA (US); Jordan Mecom, San Francisco, CA (US)

(73) Assignee: Block, Inc., Oakland, CA (US)

( * ) Notice: Subject to any disclaimer, the term of this patent is extended or adjusted under 35 U.S.C. 154(b) by 168 days.

(21) Appl. No.: 18/144,730

(22) Filed: May 8, 2023

(65) Prior Publication Data
US 2024/0378594 A1 Nov. 14, 2024

(51) Int. Cl.
*G06Q 20/36* (2012.01)
*H04L 9/08* (2006.01)

(52) U.S. Cl.
CPC ......... *G06Q 20/3678* (2013.01); *H04L 9/088* (2013.01)

(58) Field of Classification Search
CPC ............. G06Q 20/3678; G06Q 20/322; G06Q 20/326; G06Q 20/36; G06Q 20/4014; G06Q 20/223; G06Q 20/3829; G06Q 20/401; G06Q 20/409; H04L 9/088; H04L 9/3247; H04L 9/50
See application file for complete search history.

(56) References Cited

U.S. PATENT DOCUMENTS

| | | | | |
|---|---|---|---|---|
| 11,308,484 | B2 * | 4/2022 | Smirnov | G06Q 20/065 |
| 2018/0117446 | A1 * | 5/2018 | Tran | G06F 1/163 |
| 2022/0358854 | A1 * | 11/2022 | Arana | G06V 20/41 |
| 2023/0004960 | A1 | 1/2023 | Guise et al. | |
| 2023/0334472 | A1 * | 10/2023 | Pene | G06Q 20/0655 |
| 2024/0261692 | A1 * | 8/2024 | Sliwka | H04L 9/3213 |

FOREIGN PATENT DOCUMENTS

| | | |
|---|---|---|
| WO | 2016/201037 A1 | 12/2016 |
| WO | 2024/233074 A1 | 11/2024 |

OTHER PUBLICATIONS

Ryan Lanman, "Losing your keys without losing your coins", Aug. 10, 2022, Retrieved from the Internet: URL :<https://web.archive.org/web/20230320202803/https://bitkey.build/losing-your-keys-without-losing-your-coins/>, 10 pages.

(Continued)

*Primary Examiner* — Harunur Rashid
(74) *Attorney, Agent, or Firm* — Polsinelli PC

(57) ABSTRACT

A method for managing access to cryptocurrency assets includes: protecting cryptocurrency assets using a first security protocol in which signatures generated from multiple cryptographic keys are required to access a cryptocurrency address. Each of the multiple cryptographic keys are stored by one of a plurality of computing devices. The method includes receiving a user request to exit the first security protocol; authenticating the user request to exit the first security protocol; and in response to authenticating the user request, exiting the first security protocol, including transporting a descriptor for the multiple cryptographic keys to a single one of the plurality of computing devices. The descriptor enables access to the cryptocurrency address.

31 Claims, 13 Drawing Sheets

(56) References Cited

OTHER PUBLICATIONS

Hugo et al., "BIP 129 Bitcoin Secure Multisig Setup (BSMS)", Nov. 22, 2022, Created Nov. 10, 2020 Retrieved from the Internet: URL: <https://github.com/bitcoin/bips/blob/9df0b19c243362e798186d82e4484a677dc6f854/bip-0129.mediawiki>, 21 pages.

John Tinkelenberg, "How to replace a hardware wallet", Mar. 11, 2022, Retrieved from the Internet: URL :<https://blog.casa.io/how-to-replace-a-hardware-wallet/>, 8 pages.

\* cited by examiner

CRYPTOCURRENCY ACCESS MANAGEMENT

TECHNICAL FIELD

Blockchains with decentralized ledgers can be used to store and manage cryptocurrencies. Blockchain-based cryptocurrencies are virtual currency that are not regulated by any single entity. Secure personalized cryptocurrency wallets can be used by individuals to securely store virtual currency and retrieve the currency for use in transactions.

The use of cryptocurrencies can present security concerns since cryptocurrencies are managed by computer networks that are prone to cybersecurity attacks. Trading cryptocurrency is performed over network connections, exposing digital wallets to the risk of cryptocurrency theft. Security measures can be implemented to mitigate the risk of attack. Security measures can include the use of cryptographic keys that permit user access to cryptocurrency addresses while reducing the risk of theft.

BRIEF DESCRIPTION OF THE DRAWINGS

Embodiments and various aspects of the present disclosure are illustrated in the following detailed description and the accompanying figures. The various features shown in the figures may not be drawn to scale.

DETAILED DESCRIPTION

Figure 1A:
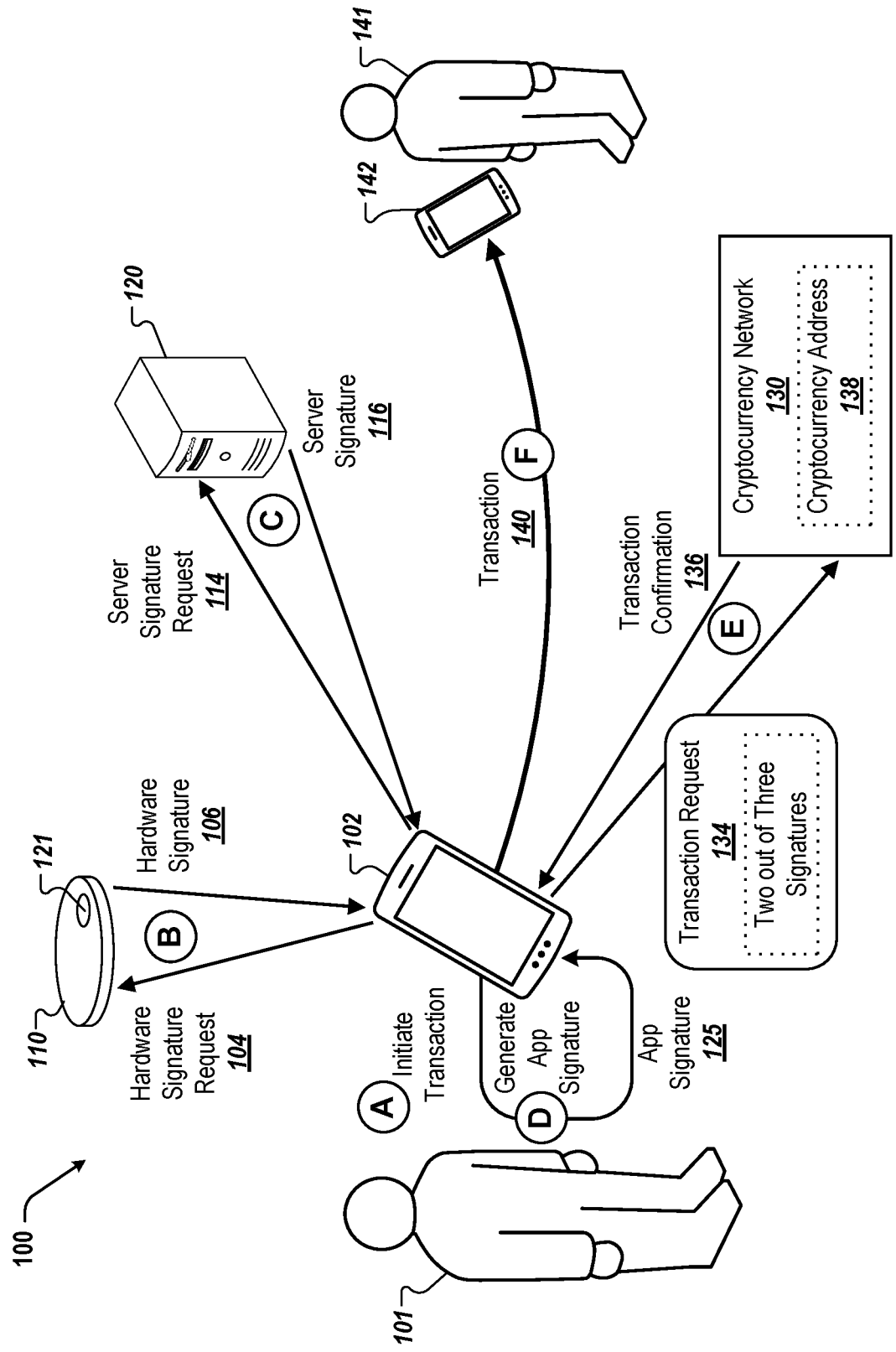
FIGS. 1A and 1B illustrate an example system for managing cryptocurrency access in a normal mode of operation.

In general, this disclosure relates to systems and methods for cryptocurrency access management. A user may use a cryptocurrency wallet to store, access, and transact cryptocurrency. The cryptocurrency wallet may be implemented by a system that includes a hardware wallet device, a mobile application on a mobile device, and a server. Cryptographic keys stored by the hardware wallet device, the mobile application, and the server can be used to authenticate cryptocurrency transactions. In some examples, each of the hardware wallet device, the mobile application, and the server stores a different private key, for a total of three private keys. In a normal mode of operation, a subset of the keys may be required to sign a transaction and, to avoid funds from being stolen if a single device is compromised, the devices may be configured so that each device does not store the key from any other device. For example, a transaction may not be completed unless two of three keys have signed the transaction. However, in some unusual circumstances, the mobile application and/or the server may become unavailable. The disclosed methods and techniques can permit the user to access the cryptocurrency assets without using the mobile application or the server. Thus, the user can access the cryptocurrency assets in a scenario in which, for example, the application and/or the server are security compromised or not functional. In this way, the user can access the cryptocurrency assets without any input from or interaction with the service provider that provides the mobile application. In some cases, the user may choose to access the cryptocurrency assets in order to migrate the assets from a current cryptocurrency wallet to a new cryptocurrency wallet. The new cryptocurrency wallet may be managed by a different service provider than the current cryptocurrency wallet. The new cryptocurrency wallet may be accessed through a different application than the application that provides access to the current cryptocurrency wallet. To migrate the cryptocurrency without the server and mobile application, the hardware wallet device can switch from operating in the normal mode to operating in a second, export mode (also referred to as a "break glass" mode) that enables a user to export the private key from the mobile device to the hardware wallet device so that the hardware wallet device is able to generate a descriptor from both the private key from the mobile device and another private key already stored by the hardware wallet device. The descriptor may be a representation of the two keys that is sufficient alone to access the funds at the cryptocurrency address. The hardware wallet may then send the descriptor to the mobile device, enabling the user to access the cryptocurrency address using the descriptor. The disclosed techniques can thus be used to migrate from the multi-signature security protocol, in which no single device stores more than one private key, to a new security protocol in which more than one private key can be stored by a single device, so that the single device can provide access to the cryptocurrency address when, for example, the application, the server, or both are security compromised or not available.

Figure 1B:
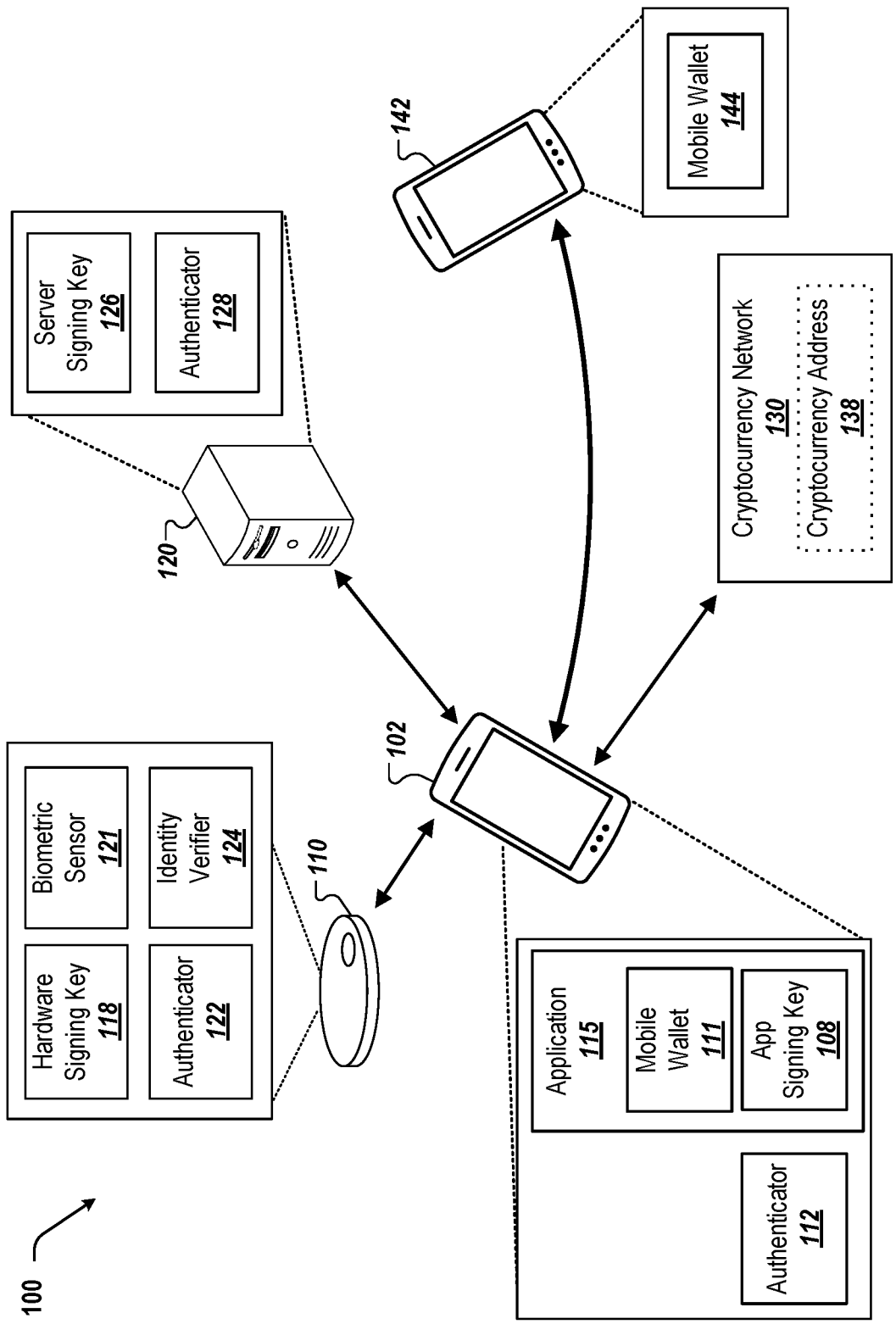

FIGS. 1A and 1B illustrate an example system 100 for managing cryptocurrency access in a normal mode of operation, according to an embodiment of the present subject matter. In some embodiments, the system 100 includes a mobile device 102, a hardware wallet device 110, a server 120, and a cryptocurrency network 130.

FIG. 1A illustrates a flow of data, shown as stages (A) to (F), which can represent steps in an example process for initiating a transaction of cryptocurrency from the mobile device 102 associated with a first user 101 to a second mobile device 142 associated with a second user 141. Stages (A) to (F) may occur in the illustrated sequence, or in a sequence that is different from the illustrated sequence. For example, some of the stages may occur concurrently. In some examples, a transaction can be executed without performing all of the stages (A) to (F).

At stage (A), the first user 101 initiates a transaction. A cryptocurrency transaction involved modifying a cryptocurrency blockchain. The blockchain is a type of database where the stored data is a series of transactions that are grouped into cryptographically linked lists called blocks. A transaction is a transfer of value on the blockchain. In some examples, a transaction is when one user gives a designated amount of cryptocurrency they own to another user.

The transaction can include transferring cryptocurrency assets (e.g., virtual coins) from a mobile wallet hosted by the mobile device 102 to a mobile wallet hosted by the mobile device 142 of the second user 141. To initiate the transaction, the first user 101 provides input to an application running on the mobile device 102. The input can include, for example, an amount of cryptocurrency assets to transfer to the second user 141, a public key identifying a cryptocurrency address associated with the second user 141, a public key identifying a cryptocurrency address 138 from which the cryptocurrency assets are to be withdrawn from, or any combination of these. In an example scenario, the first user 101 provides input indicating that one coin is to be transferred from the mobile wallet of the first user 101 to a mobile wallet of the second user 141.

At stage (B), the mobile device 102 sends a hardware signature request 104 to the hardware wallet device 110. The hardware signature request 104 can include information related to the transaction initiated by the user 101. The hardware wallet device 110 receives the hardware signature request 104. The hardware wallet device 110 uses a stored private key to generate a hardware signature 106. In some examples, a signature includes a signed hash of the transaction proposed in the signature request.

In some examples, the hardware wallet device 110 generates the hardware signature 106 in response to receiving the hardware signature request 104 and verifying the identity of the user 101. For example, the hardware wallet device 110 can prompt the user 101 to provide biometric input to a biometric sensor 121 of the hardware wallet device 110, and can verify the user's identity using the biometric input. In some examples, the hardware wallet device 110 verifies the identity of the user using a PIN or other type of passcode. After generating the hardware signature 106, the hardware wallet device 110 transmits the hardware signature 106 to the mobile device 102.

At stage (C), the mobile device 102 sends a server signature request 114 to the server 120. The server 120 receives the server signature request 114. The server signature request 114 can include information related to the transaction initiated by the user 101. The server 120 uses a stored private key to generate a server signature 116. The server 120 transmits the server signature 116 to the mobile device 102.

In some examples, the mobile device 102 sends the hardware signature request 104 instead of the server signature request 114. In some examples, the mobile device 102 sends the server signature request 114 instead of the hardware signature request 104. In some examples, the mobile device 102 sends one of the hardware signature request 104 or the server signature request 114 based on one or more rules. The rules can be set by the user 101, the service provider, or both. An example rule can state that for transaction amounts greater than a threshold value, the mobile device 102 sends the hardware signature request 104 to the hardware wallet device 110, and for transaction amounts at or below the threshold value, the mobile device 102 sends the server signature request 114 to the server 120. The threshold value can be a value set by the user 101. This can permit the user 101 to execute a transaction for smaller amounts without interacting with the hardware wallet device 110. For greater amounts (e.g., amounts greater than the threshold value), the user 101 interacts with the hardware wallet device 110 (e.g., by providing biometric input or a PIN) in order to execute the transaction. The threshold value may be based on a total transaction amount in the last twenty four hours. For example, the threshold value may be less than a total of $100 worth of cryptocurrency for all transactions in the past twenty four hours.

At stage (D), the mobile device 102 generates an application signature 125. The mobile device 102 generates the application signature 125 using a private key stored by the mobile device 102. In some examples, any two out of the three signatures are required to authenticate the transaction. The two signatures can include, for example, the hardware signature 106 and the application signature 125, the server signature 116 and the application signature 125, or the hardware signature 106 and the server signature 116.

At stage (E), the mobile device 102 sends a transaction request 134 to the cryptocurrency network 130. The transaction request 134 is authenticated by a combination of two or more of the hardware signature 106, the server signature 116, and the application signature 125. The cryptocurrency network 130 receives the transaction request 134. To keep track of the amount of cryptocurrency each user owns, the cryptocurrency network 130 uses a blockchain ledger, which is a digital file that tracks all transactions. The ledger file is not stored in a central entity server or in a single data center. Rather, the ledger file is distributed across a network of computers (e.g., nodes) that are both storing data and executing computations. Each of these computers is on the blockchain network and has a copy of the ledger file. This enables transactions to be executed quickly and securely without the need for a third party.

When the cryptocurrency network 130 receives the transaction request 134, a transaction message is then broadcast to the cryptocurrency network 130. For example, the transaction information indicates that the number of coins in the wallet of the first user 101 should go down by one coin, and the number of coins in the wallet of the second user 141 should go up by one coin. Computers in the cryptocurrency network 130 check the transaction against validation rules. The computers in the cryptocurrency network 130 apply the requested transaction to its copy of the blockchain ledger, updating the respective account balances. Validated transactions are stored into a block and are sealed with a lock referred to as a hash and a corresponding new block is added to the existing blockchain. The transaction is complete and is part of the blockchain. The mobile device 102 receives a transaction confirmation 136 from the cryptocurrency network 130.

At stage (F), the transaction 140 is completed between the mobile wallet of the mobile device 102 associated with the first user 101 and the mobile wallet of the mobile device 142 associated with the second user 141. For example, the balance of the mobile wallet of the first user 101 decreases by one coin, and the balance of the mobile wallet of the second user 141 increases by one coin.

FIG. 1B shows the system 100 in greater detail. Referring to FIG. 1B, the mobile device 102 and the second mobile device 142 can each be, for example, a smart phone, a laptop, a tablet computer, a wearable device, or any other portable device configured to communicate over a network and display information. The mobile devices 102, 142 each include a communication module for communicating over one or more wireless networks. For example, the mobile devices 102, 142 can each connect to the internet using a cellular or Wi-Fi network. The mobile devices 102, 142 can each communicate wirelessly with, for example, each other, the hardware wallet device 110, the server 120, and other computing devices.

The mobile device 102 hosts an application 115, for example, a mobile application installed on the mobile device 102 or a web application running in a web browser executing on the mobile device 120. The application 115 is a software/firmware program running on the corresponding mobile device that enables the user interface and features described throughout. The application 115 enables the user 101 to manage a mobile wallet 111 using the mobile device 102. The user 101 is a sender or receiver of cryptocurrency on a blockchain network (e.g., cryptocurrency network 130). The wallet 111 is a program linked with the cryptocurrency network 130. The wallet 111 keeps track of the cryptocurrency assets owned by the user 101 and allows the user 101 to transact with the cryptocurrency assets.

The application 115 allows the user 101 to own and manage cryptocurrency in the wallet 111 and to find other users whom they can buy cryptocurrency from or sell cryptocurrency to. The mobile device 102 may load or install the application 115 based on data received over a network or data received from local media. The application 115 enables the mobile device 102 to manage cryptocurrency assets of the mobile wallet 111 through communication with the server 120, the cryptocurrency network 130, or both. The application 115 enables the mobile device 102 to conduct transactions with other wallets and other devices, such as the mobile wallet 144 managed by the second mobile device 142.

The mobile device 102 can store a private cryptographic key (e.g., an application signing key ("app signing key") 108). The mobile device 102 can use the application signing key 108 to sign transactions associated with a cryptocurrency address 138 of the cryptocurrency network 130. In some examples, the application signing key 108 is a private key of one of multiple public-private key pairs for the cryptocurrency address 138.

The mobile device 102 can include an authenticator 112 for authenticating communications received from the hardware wallet device 110 and from the server 120. The hardware wallet device 110 can include an authenticator 122 for authenticating communications received from the mobile device 102 and from the server 120. The server 120 can include an authenticator 128 for authenticating communications received from the mobile device 102 and from the hardware wallet device 110. For example, the mobile device 102, hardware wallet device 110, and server 120 may include authentication keys that are separate from the signing keys 118, 126, 108 where the authentication keys are used to authenticate the devices to each other as opposed to the signing keys 118, 126, 108 which are used to authenticate a transaction to the blockchain.

The hardware wallet device 110 provides additional layers of security when conducting transactions and can act as a self-serve recovery kit, for example, when a user loses their mobile device. The hardware wallet device 110 can include at least one processor that is connected to a communication interface and a memory. In general, the processor may interact and control the components of the hardware wallet device 110. The communication interface can include circuitry that is configured to communicate with other devices over various communication channels. In some examples, the hardware wallet device 110 can communicate over short-range, peer-to-peer communication channels (e.g., Bluetooth, near field communication (NFC), or radio frequency identification (RFID)). In some examples, the hardware wallet device 110 can communicate over networks such as the internet. The hardware wallet device 110 can communicate with components of the system 100 including the mobile device 102, the server 120, and the cryptocurrency network 130.

The hardware wallet device 110 can store a private cryptographic key (e.g., a hardware signing key 118). The hardware wallet device 110 can use the hardware signing key 118 to sign transactions associated with the cryptocurrency address 138 of the cryptocurrency network 130. In some examples, the hardware signing key is a private key of one of multiple public-private key pairs for the cryptocurrency address 138.

The hardware wallet device 110 can include a biometric sensor 121 and an identity verifier for verifying an identity of an authorized user. For example, the identity verifier 124 may verify that biometric data received through the biometric sensor 121 matches biometric data previously received through the biometric sensor 121 during a registration process. The biometric sensor can be, for example, a fingerprint sensor located on a surface of the hardware wallet device 110. Other types of biometric sensors are possible, for example, a camera for iris or facial recognition, a microphone for voice verification, etc. The identity verifier 124 can store information that can be used to verify a user's identity. The information can include biometric information, such as fingerprints, facial recognition information, iris or retina recognition information, voice recognition information, or any combination of these.

In some examples, the hardware wallet device 110 might not have access to the internet or other form of wireless network. For example, the hardware wallet device 110 may be configured to communicate via short-range communication channels. Limiting the range of the hardware wallet device 110 can enhance security by reducing the likelihood of unauthorized access to data stored in the hardware wallet device 110. In some cases, the hardware wallet device 110 may be kept for extended times in a secure location. When communication with the hardware wallet device 110 is desired, such as for authorization of a transaction involving the cryptocurrency managed by the hardware wallet device 110, the user 101 can bring the mobile device 102 and the hardware wallet device 110 within close proximity to each other.

The server 120 includes at least one processor that is connected to a network interface and a memory. In general, the processor may interact and control the components of the server 120. The communication interface can include circuitry that is configured to communicate with other devices over various communication channels. In some examples, the server 120 can communicate over networks such as the internet. The server 120 can communicate with components of the system 100 including the mobile device 102, the hardware wallet device 110, and the cryptocurrency network 130.

The server 120 can store a private cryptographic key (e.g., a server signing key 126). The server 120 can use the server signing key 126 to sign transactions associated with the cryptocurrency address 138 of the cryptocurrency network 130. In some examples, the server signing key 126 is a private key of one of multiple public-private key pairs for the cryptocurrency address 138.

The cryptocurrency network 130 includes multiple cryptocurrency addresses, including the cryptocurrency address 138. The cryptocurrency address 138 is a unique sequence of numbers and letters identifying the wallet 111 assigned to the user 101. The cryptocurrency address 138 serves as a virtual location where cryptocurrency can be sent to the user 101. The cryptocurrency address 138 is used to receive and send cryptocurrency funds.

The cryptocurrency address 138 is secured by a multi-signature public key cryptographic method, which uses multiple asymmetric key pairs (e.g., private-public key pairs). The public keys are derived from the private keys. Public key and private keys are binary numbers that are presented as series of alphanumeric characters. The private keys are used to withdraw cryptocurrency and are backed up and kept secret. The public keys are used to receive cryptocurrency and can be freely shared in a manner similar to a bank account number. Each cryptocurrency address is associated with at least one private key that is needed to make transactions involving the cryptocurrency address.

In some examples, the cryptocurrency address 138 is defined by three public keys, with each of the public keys corresponding to one private key. In the example of system 100, two out of three private keys are used together to move cryptocurrency. Each private key partially authenticates transactions with the cryptocurrency address. Therefore, the managing service provider cannot move cryptocurrency without the user 101, since the server 120 owned by the service provider only stores one private key. The user 101 can move cryptocurrency at any time without the managing service provider, since the mobile device 102 and the hardware wallet device 110 should be in possession by the user 101 and each store one private key. Thus, the system 100 enables the user 101 to move cryptocurrency out of the wallet 111 without interacting with the server 120 by using the application signing key 108 and the hardware signing key 118.

Figure 2:
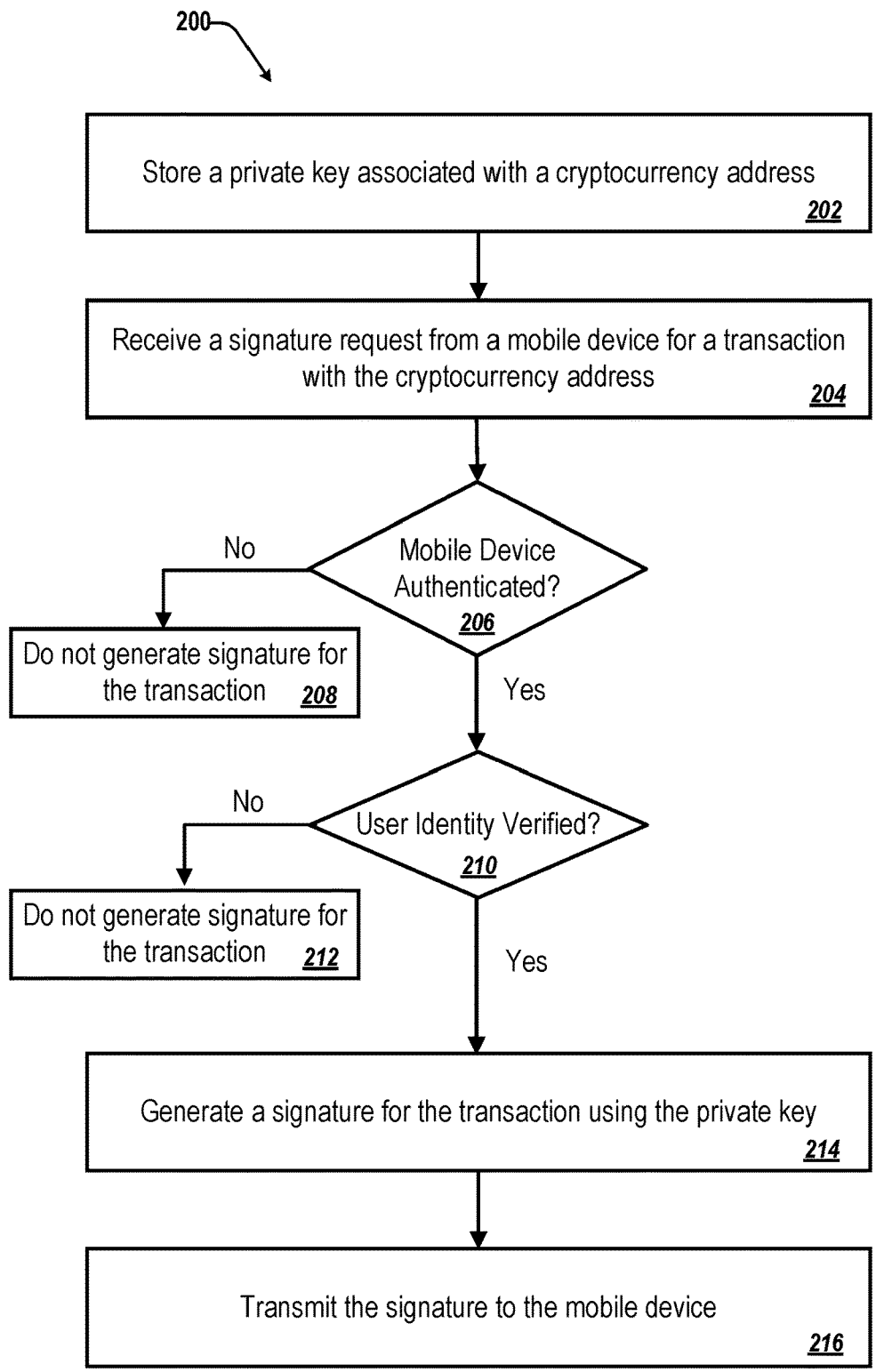
FIG. 2 is a flow diagram of an example process for executing a cryptocurrency transaction.

FIG. 2 is a flow diagram of an example process 200 for executing a cryptocurrency transaction. The process 200 can be performed by the hardware wallet device 110 of system 100.

The process 200 includes storing a private key associated with a cryptocurrency address (202). For example, the hardware wallet device 110 stores the hardware signing key 118.

The process 200 includes receiving a signature request from a mobile device for a transaction with the cryptocurrency address (204). For example, the hardware wallet device 110 receives the hardware signature request 104 from the mobile device 102. In some examples, the hardware wallet device 110 receives the hardware signature request 104 over short-range communications such as NFC.

The process 200 includes authenticating the mobile device (206). For example, the hardware wallet device 110 includes an authenticator 122. The hardware signature request 104 can include authenticating information from the mobile device 102. The authenticating information can include, for example, credential information that identifies the mobile device. The authenticating information is used to authenticate the mobile device to the hardware wallet device 110 using the authenticator 122.

The process 200 includes determining to not generate a signature for the transaction in response to determining that the mobile device is not authenticated (208). For example, the hardware wallet device 110 can determine that the mobile device 102 did not provide timely or adequate credentials to authenticate itself to the hardware wallet device 110. In response, the hardware wallet device 110 can determine not to generate the hardware signature 106.

The process 200 includes verifying a user identity in response to determining that the mobile device is authenticated (210). For example, the hardware wallet device 110 can obtain biometric input from the user 101 through the biometric sensor 121, and the identity verifier 124 can compare the biometric input to the stored biometric information. The identity verifier 124 can then determine whether the user 101 is authorized to initiate transactions with the cryptocurrency address 138.

In some examples, the hardware wallet device 110 can verify the user identity using other identifying information in addition to, or instead of, the biometric input. The other identifying information can include, for example, a PIN, a passcode, a password, or other user input.

In some examples, the hardware wallet device 110 can prompt the user 101 to provide the identifying information. For example, the hardware wallet device 110 can include one or more lights or speakers. The hardware wallet device 110 can prompt the user 101 to provide the identifying information by illuminating a light, by generating audible sound through a speaker, or both.

The process 200 includes determining to not generate a signature for the transaction in response to determining that the user identity is not verified (212). For example, the hardware wallet device 110 can determine that the user 101 did not provide adequate credentials to identify themself to the hardware wallet device 110. In some examples, the hardware wallet device 110 can determine that the user 101 did not provide identifying information within a specified time limit. In some examples, the hardware wallet can determine that the user provided identifying information that did not match the stored identifying information within a threshold similarity. In response, the hardware wallet device 110 can determine not to generate the hardware signature 106.

The process 200 includes generating a signature for the transaction using the private key in response to determining that the user identity is verified (214). For example, the hardware wallet device 110 can generate the hardware signature 106 in response to verifying the identity of the user 101.

The process 200 includes transmitting the signature to the mobile device (216). For example, the hardware wallet device 110 can transmit the hardware signature 106 to the mobile device 102. The hardware wallet device 110 can transmit the hardware signature 106 to the mobile device 102, for example, using NFC.

In some circumstances, a user may choose to remove cryptocurrency from a wallet. For example, the user may choose to move cryptocurrency from a currently used cryptocurrency wallet to a new wallet. In some cases, the new wallet may be managed by a different service provider than the currently used wallet and/or may be accessed using a different application than the currently used wallet. Users can generally move cryptocurrency out of a cryptocurrency wallet through Proof of Reserves (POR) through an on-chain transaction executed with a server through an application. However, POR may need at least two of three keys to sign a transaction, e.g., as described in the system 100 of FIGS. 1A and 1B, and in some cases, a cryptocurrency wallet may enter a state where a server, the application, or both, are inaccessible and unable to sign transactions using their respective keys. For example, the application may not be available for download or may be inoperable. In these examples, cryptocurrency may be trapped in the cryptocurrency wallet that is not spendable.

The disclosed techniques can be used to provide user with an option to "break the glass" and export two cryptographic keys from their cryptocurrency wallet. This allows a user to access their cryptocurrency even if the application, the server, or both are inaccessible or malicious. A mechanism is provided for users to export a representation of a signing quorum (e.g., two out of three) of keys out of their current cryptocurrency wallet and use that representation in another cryptocurrency wallet. The mechanism can be used without access to the server. The mechanism can be used if the application has been removed or blocked from the local application stores. The mechanism can be used without exotic or specialty hardware, and without additional hardware beyond the mobile device (e.g., phone) and hardware wallet device.

Figure 3:
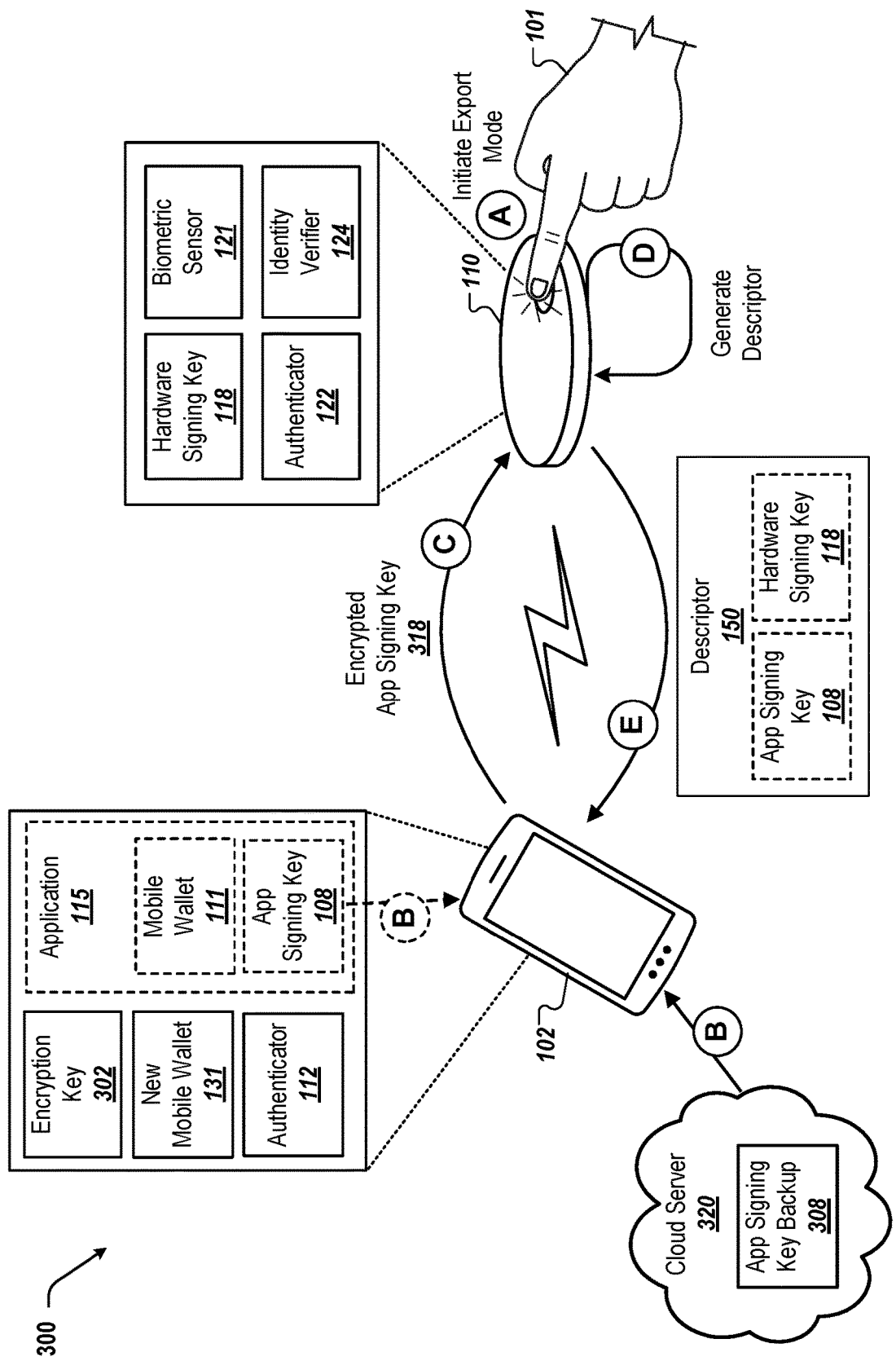
FIG. 3 illustrates an example system for managing cryptocurrency access in an export mode of operation, according to some implementations of the present subject matter.

FIG. 3 illustrates an example system 300 for managing cryptocurrency access in an export mode of operation. The system 300 includes the mobile device 102 and the hardware wallet device 110.

FIG. 3 illustrates an example flow of data, shown as stages (A) to include, which can represent steps in an example process for generating and exporting a descriptor of two private keys to the mobile device 102. Stages (A) include (E) may occur in the illustrated sequence, or in a sequence that is different from the illustrated sequence. For example, some of the stages may occur concurrently.

At stage (A), the export mode is initiated. The export mode can be initiated by the user 101. The user 101 may choose to initiate export mode at any time. The user 101 can choose to initiate export mode, for example, when the application 115 is not available or not functional. In some cases, the user can choose to initiate export mode when the server 120 is not available, is not communicating with the mobile device 102, or is not functional. The user 101 can choose to initiate export mode when the user 101 decides to no longer use the application 115, the wallet 111, or both.

The application and hardware wallet device can be implemented with a feature that enables entry in to the "break glass" (or "export") mode. Activating the break glass feature initially puts each device (e.g., the mobile device running the application and the hardware wallet device) into a "pending break glass" mode. In the pending break glass mode, the mobile device 102 accesses, and in some cases encrypts, the application signing key 108 in preparation for transmitting the application signing key to the hardware wallet device 110. In the break glass mode, the mobile device 102 outputs the application signing key to the hardware wallet device 110, so that the hardware wallet device 110 has both the hardware signing key and the application signing key.

Transitioning into the pending break glass mode may be purposefully configured to be difficult to initiate accidentally. For example, multiple confirmations may be requested through the application and multiple thumbprint scans can be performed by the hardware. In some examples, warning lights and/or notifications can be provided to the user before entering the pending break glass mode. For example, a light can flash red, and an audible alarm can be activated.

The user 101 can initiate export mode by interacting with the mobile device 102 or the hardware wallet device 110 in a prescribed way. In some examples, the user 101 can initiate export mode by interacting with a component of the hardware wallet device 110 such as the biometric sensor 121. For example, the user 101 can interact with the biometric sensor 121 according to a preset pattern. The preset pattern can be set by the service provider or by the user 101 in advance of initiating export mode. The preset pattern can include, for example, holding a finger to the biometric sensor for at least a threshold time duration, removing the finger from the biometric sensor, and repeating these actions a prescribed number of times. In some examples, the preset pattern can include placing different fingers on the biometric sensor in a designated order. In an example, the preset pattern includes placing a thumb on the biometric sensor 121 for between three and four seconds, removing the thumb from the biometric sensor 121, within two seconds placing a forefinger on the biometric sensor 121 for between three and four seconds, removing the forefinger from the biometric sensor 121, within two seconds placing the thumb on the biometric sensor 121 for between three and four seconds, and removing the thumb from the biometric sensor 121.

In some examples, the hardware wallet device 110 can perform user verification during initiation of the export mode. For example, the hardware wallet device 110 can determine that the user 101 interacts with the hardware wallet device 110 according to the preset pattern of timing of thumb presses, and that the biometric input provided by the user 101 matches stored biometric information for the user within a threshold similarity. If the interaction matches the preset pattern, but the biometric input does not match the stored biometric information, the hardware wallet device can determine not to enter the export mode.

By interacting with the hardware wallet device 110, the user 101 can initiate export mode even when the application 115, the server 120, or both, are unavailable or not functional. In some examples, the user 101 can choose to initiate the export mode when the application 115 and the server 120 are available and functional. In these examples, the user 101 can initiate export mode using the application 115. For example, the application 115 can include a selectable option for initiating export mode. The application 115 may prompt the user 101 to provide authenticating information to the mobile device 102 before initiating export mode. For example, the application 115 can prompt the user 101 to enter a PIN or passcode before initiating export mode.

In some examples, procedures for initiating export mode can include physically damaging the hardware wallet device 110. For example, initiating export mode may require opening a casing of the hardware wallet device 110, breaking a seal of the hardware wallet device 110, breaking a tab of the hardware wallet device 110, or any combination of these. In some examples, the physical damage to the hardware wallet device 110 can prevent future use of the hardware wallet device 110 to authenticate cryptocurrency transactions.

In some implementations, a server (e.g., server 120) may attempt to initiate the export mode. For example, the server may determine that the user 101 is no longer permitted to use the application 115 and instruct the application 115 to both initiate the export mode and also instruct the wallet 111 to initiate the export mode.

At stage (B), the mobile device 102 accesses the application signing key 108 or an application signing key backup 308. In some examples, the application 115 is available on the mobile device 102, and the mobile device 102 can access the application signing key 108 from the application 115. In some examples, the application 115 is not available on the mobile device 102, and the mobile device 102 accesses the application signing key backup 308 instead of accessing the application signing key 108 from the application 115.

The application signing key backup 308 can be stored on a cloud server 320. In some examples, the application signing key backup 308 is stored on the cloud server 320 as part of a routine data backup process performed by the application 115 or by the mobile device 102. The application signing key backup 308 can be an encrypted copy of the application signing key 108. The mobile device 102 can access the application signing key backup 308 on the cloud server 320 even when the application 115 is not running on the mobile device 102.

In some examples, the mobile device 102 accesses the application signing key backup 308 in response to user input to the mobile device 102 that instructs the mobile device 102 to download the application signing key backup 308 from the cloud server 320.

The mobile device 102 encrypts the application signing key 108 or the application signing key backup 308 to generate an encrypted application signing key 318. The mobile device 102 can encrypt the application signing key 108, for example, using an encryption key 302. In some examples, the encryption key 302 is used to encrypt the application signing key 108 by key wrapping.

Once in the pending break glass mode, the user can tap the mobile device to the hardware wallet device. The application from the phone can send the first private key ("application signing key") to the hardware wallet device. For example, at stage (C), the mobile device 102 transmits the encrypted application signing key 318 to the hardware wallet device 110. In some examples, the mobile device 102 transmits the encryption key 302 to the hardware wallet device 110 in addition to the encrypted application signing key 318. In some examples, the mobile device 102 transmits the encrypted application signing key 318 to the hardware wallet device 110 using NFC.

In some cases, such as when export mode is initiated through the application 115, the application 115 may cause the mobile device to automatically transmit the encrypted application signing key 318 to the hardware wallet device 110. In some cases, after the export mode is initiated through the application 115, the application 115 can provide a selectable icon through a user interface that, when selected, causes the mobile device 102 to output the encrypted application signing key 318 to the hardware wallet device 110.

In some examples, the mobile device 102 outputs user identifying information, such as a PIN or passcode, to the hardware wallet device 110 in addition to the encrypted application signing key 318. The user identifying information can be provided by the user 101 to the mobile device upon initiating export mode. For example, in some cases the hardware wallet device 110 does not include a biometric sensor or other means to directly verify user identity, and the hardware wallet device 110 instead verifies user identity with identifying information received from the mobile device 102. In some cases, the execution of export mode requires multiple user identification factors. For example, before generating a descriptor, the hardware wallet device 110 can verify user identity using both biometric input to the biometric sensor 121 and user identifying information received from the mobile device 102.

After receiving the application signing key, the hardware wallet device is in possession of both the application signing key and the second private key ("hardware signing key"). Both the application and the hardware wallet device are now in break glass mode. Once in break glass mode, the application can display warnings that the application key has been exported.

In some cases, such as when export mode is initiated through the hardware wallet device 110, the mobile device 102 can write the encrypted application signing key 318 to an NFC tag and output the NFC tag to the hardware wallet device 110. For example, the mobile device 102 writes the encrypted application signing key 318 from the application signing key backup 308 to an NFC tag. In some examples, the mobile device 102 writes the encrypted application signing key 318 to the NFC tag in response to receiving user input instructing the mobile device 102 to write the encrypted application signing key 318 to the NFC tag. The instructions can be received from the user, for example, using an NFC application. The NFC application can enable the user to select the encrypted application signing key 318 as a payload to write to the NFC tag.

The hardware wallet device 110 receives the encrypted application signing key 318 from the mobile device 102. In some examples, the hardware wallet device 110 receives the encryption key 302 from the mobile device 102. The hardware wallet device 110 can use the encryption key 302 to decrypt the encrypted application signing key 318. The hardware wallet device 110 stores both the application signing key 108 and the hardware signing key 118, which can be combined into a descriptor (e.g., descriptor 150).

At stage (D), the hardware wallet device 110 generates the descriptor 150 for the application signing key 108 and the hardware signing key 118. A descriptor includes a function and one or more inputs to that function. A descriptor is a file that enables transport of public keys and private keys among wallets, and enables import and export of keys. The descriptor 150 can include a function, a derivation path, and identifying information for the application signing key 108 and the hardware signing key 118. The descriptor 150 has a standardized format that is readable by any cryptocurrency wallet. In some examples, the application signing key 108 and the hardware signing key 118 are not derivable from the descriptor 150.

When the hardware wallet device authenticates the user (e.g., using a fingerprint scan or personal identification number (PIN)), the hardware wallet device can emulate an NFC tag such as an ISO 14443 NFC tag. In some examples, the hardware wallet device emulates the NFC tag for a prescribed time duration, e.g., thirty seconds. The hardware wallet device serves a wallet output descriptor over NFC. Thus, if the user taps the hardware wallet device with the phone, the phone will receive a wallet output descriptor over NFC as if the user had tapped a simple NFC tag that contains a text string. For example, at stage (E), the hardware wallet device 110 transmits the descriptor 150 to the mobile device 102. In some examples, the hardware wallet device 110 can transmit the descriptor 150 to another device instead of or in addition to the mobile device 102, such as another hardware wallet device. In some examples, the mobile device 102 reads the descriptor 150 from the hardware wallet device 110 using NFC.

In some examples, the wallet output descriptor is encrypted. The wallet output descriptor contains both the application and hardware private keys. The wallet output descriptor can be loaded into other cybersecurity wallets in order to recover customer funds. For example, the descriptor 150 enables access to the cryptocurrency address 138. The mobile device 102 can receive and store the descriptor 150. The descriptor 150 can be entered into a new mobile wallet 131 on the mobile device 102. For example, the user 101 can copy the descriptor 150 into an application for the new mobile wallet 131 in order to permit the new mobile wallet 131 to access the cryptocurrency address 138. The new mobile wallet 131 may be managed by a different service provider than the mobile wallet 111. Once the descriptor 150 has been entered into the new mobile wallet 131, the user 101 can conduct transactions with the cryptocurrency address 138 without using the mobile wallet 111, the application 115, or the server 120.

In some examples, the hardware wallet device 110 can provide access to multiple wallets and/or multiple cryptocurrency addresses. The multiple wallets and addresses can be associated with a single user or with multiple different users. For example, the hardware wallet device 110 can store multiple hardware signing keys, with each hardware signing key being associated with a different cryptocurrency address. In the export mode, the hardware wallet device 110 can receive an encrypted application signing key for one of the cryptocurrency addresses. The hardware wallet device 110 can then decrypt the encrypted application signing key and can select, from the multiple hardware signing keys, the hardware signing key associated with the application signing key. The hardware wallet device 110 can generate and export a descriptor for the application signing key and for the selected hardware signing key. In this way, the hardware wallet device 110 can export a descriptor for one of the hardware signing keys while maintaining other hardware signing keys securely stored by the hardware wallet device 110.

In some implementations, instead of the app signing key 108, hardware signing key 118, and the server signing key 126 being separate keys, the keys 108, 118, 126 may each be part of a single key that is represented by the combination of the keys 108, 118, and 126.

Figure 4A:
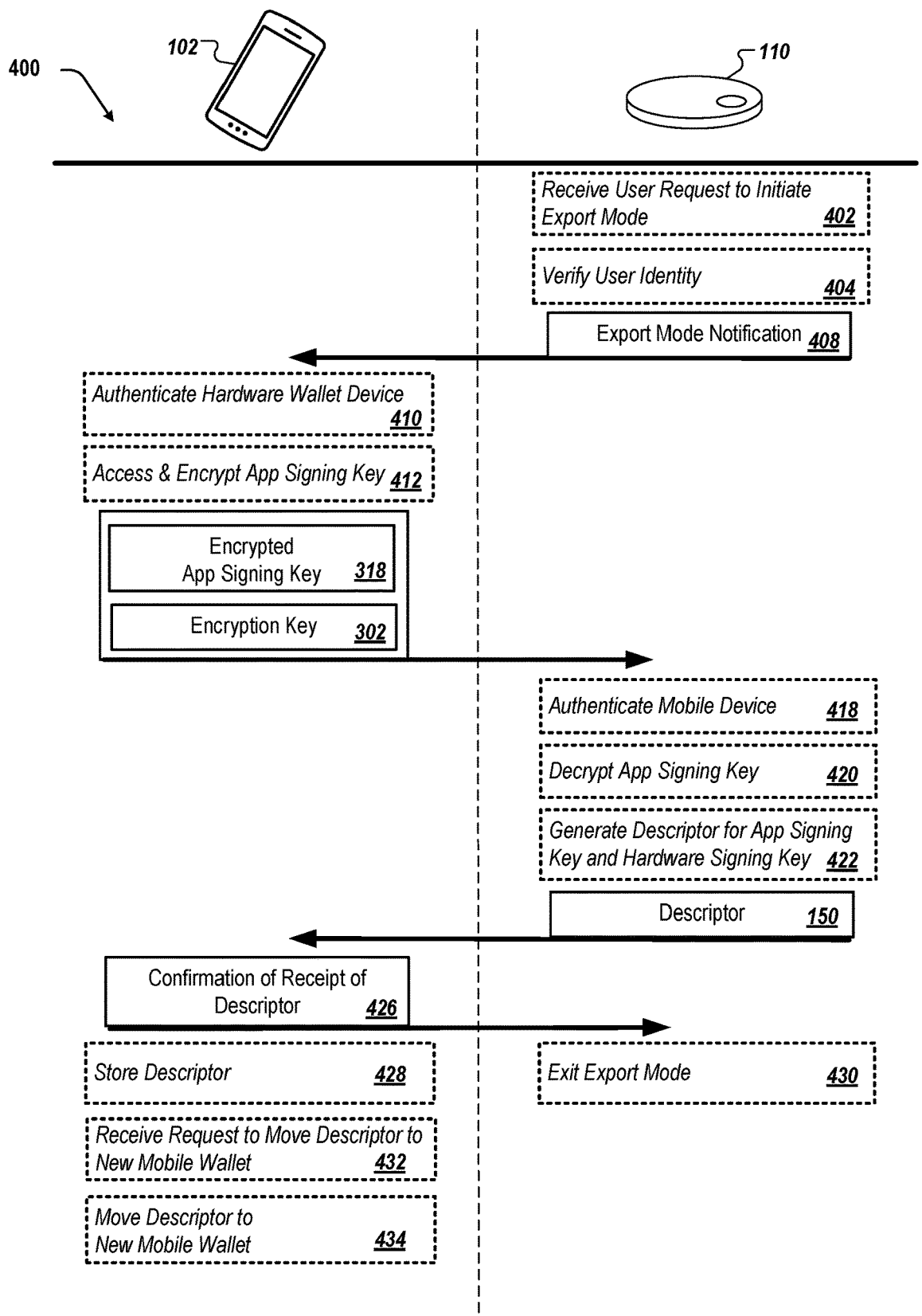
FIG. 4A is a swimlane diagram of an example process for managing cryptocurrency access in an export mode of operation initiated by a hardware wallet device, according to some implementations of the present subject matter.

FIG. 4A is a swimlane diagram of an example process 400 for managing cryptocurrency access in an export mode of operation initiated by a hardware wallet device. Steps of the process 400 may occur in the illustrated sequence, or in a sequence that is different from the illustrated sequence. For example, steps may occur concurrently or in a different order than shown in FIG. 4A. The process 400 can be executed when the application 115 is not running on the mobile device 102, when the application 115 is not able to communicate with the server 120, or both. In some cases, the process 400 can be executed when the user chooses to initiate export mode using the hardware wallet device 110 instead of using the application 115. The user can choose to initiate export mode using the hardware wallet device 110 even when the application 115 is running on the mobile device 102 and/or when the application 115 is able to communicate with the server 120.

At step 402, the hardware wallet device 110 receives a user request to initiate export mode. For example, the user request can include at least one press of a finger on a fingerprint sensor of the hardware wallet device 110. In some examples, receiving the user request includes detecting a pattern of finger presses that matches a preset pattern within a threshold similarity.

At step 404, the hardware wallet device 110 verifies the user identity. For example, the hardware wallet device 110 can verify the user identity using biometric input sensed by the biometric sensor 121. The hardware wallet device 110 outputs an export mode notification 408 to the mobile device 102. For example, the hardware wallet device 110 can output a message to the mobile device 102 indicating that the hardware wallet device 110 is entering export mode. The hardware wallet device 110 can output authentication information for the hardware wallet device 110, such as a device credential, to the mobile device 102. The hardware wallet device 110 can output the authentication information with, or as part of, the export mode notification 408.).

At step 410, the mobile device 102 receives the export mode notification 408 and, in response, authenticates the hardware wallet device 110. For example, the mobile device 102 can use the authenticator 112 to authenticate the hardware wallet device 110 using the authentication information provided by the hardware wallet device 110. The mobile device 102 can authenticate the hardware wallet device 110, for example, by comparing the authentication information to stored authentication information for the hardware wallet device 110, by comparing the information to authentication information previously received from the hardware wallet device 110, or any combination of these.

At step 412, the mobile device 102 accesses and encrypts the application signing key. For example, referring to FIG. 3, the mobile device 102 can access the application signing key 108 from the application 115 or from application signing key backup 308 stored on the cloud server 320. The mobile device 102 encrypts the application signing key 108 using the encryption key 302. For example, the encryption key 302 can be a key-encryption key, and the application signing key 108 can be encrypted with the key-encryption key using a key wrapping algorithm.

The mobile device 102 outputs the encrypted application signing key 318 and the encryption key 302 to the hardware wallet device 110. For example, the mobile device 102 can output the wrapped application signing key and the key-encryption key that was used to encrypt the application signing key. The hardware wallet device 110 receives the encrypted application signing key 318 and the encryption key 302 from the mobile device 102. In some implementations, instead of receiving the encryption key 302 from the mobile device 102, the hardware wallet device 110 stores a copy of the encryption key 302. For example, the mobile device 102 and the hardware wallet device 110 can each store a copy of a key-encryption key. The mobile device 102 can use the key-encryption key to wrap the application signing key, and the hardware wallet device 110 can use the key-encryption key to unwrap the application signing key. The mobile device 102 can output authentication information for the hardware mobile device 102, such as a device credential, to the hardware wallet device 110. In some examples, the hardware mobile device 102 can output the authentication information with the encrypted application signing key 318.

At step 418, the hardware wallet device 110 authenticates the mobile device 102. For example, the hardware wallet device 110 can use the authenticator 122 to authenticate the mobile device 102 using the authentication information provided by the mobile device 102. The hardware wallet device 110 can authenticate the mobile device 102, for example, by comparing the authentication information to stored authentication information for the mobile device 102, by comparing the information to authentication information previously received from the mobile device 102, or any combination of these.

At step 420, the hardware wallet device 110 decrypts the encrypted application signing key 318 using the encryption key 302. For example, the hardware wallet device 110 can decrypt the encrypted application signing key 318 using the encryption key 302 that was received from the mobile device 102, or that was stored by the hardware wallet device 110. In some examples, the encryption key 302 is a key-encryption key, and the hardware wallet device 110 unwraps the encrypted application signing key 318 using the key-encryption key.

At step 422, the hardware wallet device 110 generates the descriptor 150 for the application signing key 318 and for the hardware signing key 118. For example, the descriptor can include a function, a derivation path, and identifying information for the application signing key 108 and the hardware signing key 118. The hardware wallet device 110 outputs the descriptor 150 to the mobile device 102. For example, the hardware wallet device 110 can send the descriptor 150 to the mobile device 102 over NFC.

In some implementations, the hardware wallet device 110 encrypts the descriptor 150 before sending the descriptor 150 to the mobile device 102. For example, the hardware wallet device 110 can encrypt the descriptor with the encryption key 302 or with another encryption key or wrapping key. Upon receipt of the encrypted descriptor 150, the mobile device 102 can decrypt the descriptor 150. For example, the mobile device 102 can decrypt the descriptor 150 with the encryption key or with an open-source recovery tool. In some implementations, the descriptor 150 can be in a standard script format, enabling use of an open-source recovery tool to decrypt the descriptor 150.

In some implementations, the encrypted descriptor is migrated to a new mobile wallet (e.g., new mobile wallet 131) before the descriptor is decrypted. For example, the user can migrate the encrypted descriptor to the new mobile wallet 131, and then the new mobile wallet 131 can decrypt the descriptor 150.

In some implementations, the encrypted descriptor can be decryptable by an encryption key that is based on a serial number. For example, the encrypted descriptor can be decryptable by an encryption key based on a serial number of the mobile device 102 or of the hardware wallet device 110. Thus, after exporting the descriptor 150 to the mobile device 102, the user can locate the serial number, generate the encryption key from the serial number, and enter the encryption key (e.g., as input to the mobile device 102) in order to decrypt the descriptor 150.

In some implementations, the hardware wallet device 110 outputs the descriptor 150 by activating an NFC mode in which the hardware wallet device 110 transmits the descriptor 150 over NFC. For example, in response to being positioned within a threshold distance from the mobile device 102, the hardware wallet device 110 can activate the NFC mode to communicate with the mobile device 102. The hardware wallet device 110 can maintain the NFC mode for a preset time duration or until the hardware wallet device 110 receives a confirmation 426 of receipt of the descriptor 150 from the mobile device 102. For example, the hardware wallet device 110 can maintain the NFC mode for preset time duration of 10 seconds, twenty seconds, thirty seconds, etc. In some implementations, the hardware wallet device 110 deactivates the NFC mode in response to receiving the confirmation 426. For example, in response to receiving the descriptor 150, the mobile device 102 can output the confirmation 426 to the hardware wallet device over NFC. In some implementations, the hardware wallet device 110 deactivates the NFC mode if no confirmation is received within the preset time duration. For example, if the hardware wallet device 110 does not receive the confirmation 426 within the preset time duration, the hardware wallet device can cease sending the descriptor 150 over NFC. In some implementations, after deactivating NFC mode, the hardware wallet device 110 can reactivate NFC mode in response to receiving input from a user, in response to verifying a user identity, in response to being placed within a threshold proximity to the mobile device 102, or any combination of these.

Upon receiving the confirmation 426 from the mobile device 102, the hardware wallet device 110 exits export mode 430. In some examples, after exiting export mode 430, the hardware wallet device 110 can re-enter a normal mode in which the hardware wallet device 110 generates hardware signatures. For example, the hardware wallet device 110 can be associated with multiple cryptocurrency addresses. After exporting a descriptor for one of the multiple cryptocurrency addresses, the hardware wallet device 110 can re-enter a normal mode for authenticating transactions for the other cryptocurrency addresses.

In some implementations, after exiting export mode 430, the hardware wallet device 110 does not re-enter a normal mode in which the hardware wallet device 110 generates hardware signatures. For example, the hardware wallet device 110 can be configured such that operation in the export mode prohibits later operation in a normal mode. In some examples, after operation in the export mode, the hardware wallet device 110 can disable itself such that the hardware wallet device 110 is no longer operable to authenticate cryptocurrency transactions.

At step 438, the mobile device 102 stores the descriptor 150. At step 432, the mobile device 102 receives a request to move the descriptor 150 to a new mobile wallet, such as new mobile wallet 131. At step 434, the mobile device 102 moves the descriptor 150 to the new mobile wallet.

Figure 4B:
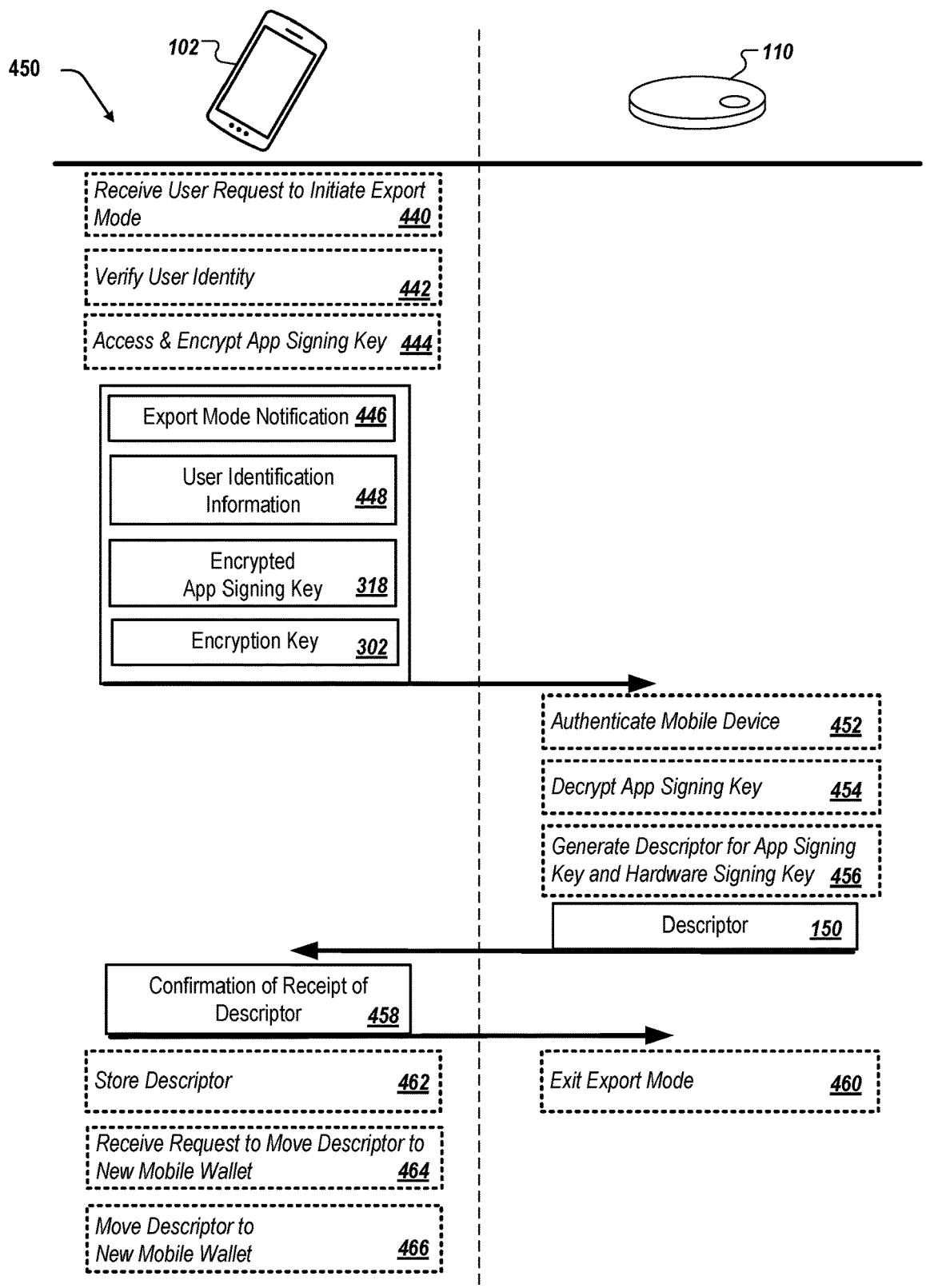
FIG. 4B is a swimlane diagram of an example process for managing cryptocurrency access in an export mode of operation initiated by a cryptocurrency application, according to some implementations of the present subject matter.

FIG. 4B is a swimlane diagram of an example process 450 for managing cryptocurrency access in an export mode of operation initiated by a cryptocurrency application. Steps of the process 450 may occur in the illustrated sequence, or in a sequence that is different from the illustrated sequence. For example, steps may occur concurrently or in a different order than shown in FIG. 4B. The process 450 can be executed when the application 115 is running on the mobile device 102, when the application 115 is able to communicate with the server 120, or both At step 440, the mobile device 102 receives a user request to initiate export mode. For example, the user request can include at least one press of a finger on a fingerprint sensor of the hardware wallet device 110. In some examples, receiving the user request includes detecting a pattern of finger presses that matches a preset pattern within a threshold similarity.

At step 442, the mobile device 102 verifies the user identity. For example, the mobile device 102 can verify the user identity using biometric input sensed by the biometric sensor 121, using a PIN, using a passcode, or any combination of these.

At step 444, the mobile device 102 accesses and encrypts the application signing key. For example, the mobile device 102 can access the application signing key 108 from the application 115 or from application signing key backup 308 stored on the cloud server 320. The mobile device 102 encrypts the application signing key 108 using the encryption key 302. For example, the encryption key 302 can be a key-encryption key, and the application signing key 108 can be encrypted with the key-encryption key using a key wrapping algorithm.

The mobile device 102 outputs an export mode notification 446 to the mobile device 102. For example, the mobile device 102 can output a message to the hardware wallet device 110 indicating that the mobile device 102 is entering export mode. The mobile device 102 can output authentication information for the mobile device 102, such as a device credential, to the hardware wallet device 110. The mobile device 102 can output the authentication information with, or as part of, the export mode notification 446. In some implementations, the mobile device 102 outputs user identification information 448 to the hardware wallet device 110. For example, the mobile device 102 can output, to the hardware wallet device 110, a message indicating that the user's identity has been verified. In some examples, the mobile device 102 can output identification information 448 to the hardware wallet device 110 that identifies the user, such as fingerprint information, passcode information, or PIN information. The mobile device 102 outputs the encrypted application signing key 318 and the encryption key 302 to the hardware wallet device 110. For example, the mobile device 102 can output the wrapped application signing key and the key-encryption key that was used to encrypt the application signing key.

The hardware wallet device 110 receives the export mode notification 446 and the user identification information 448 from the mobile device 102. In some examples, the hardware wallet device 110 uses the identification information 448 to perform additional verification of the identity of the user that requested entry into export mode. For example, the user identification information 448 can include a PIN input by the user, and the hardware wallet device 110 can compare the PIN to a stored PIN. In some examples, the hardware wallet device 110 obtains additional information in order to perform additional user identification verification. For example, the user identification information 448 received from the mobile device 102 can include a PIN input by the user, and the hardware wallet device 110 can obtain biometric input from the user to further confirm the user identity.

The hardware wallet device 110 receives the encrypted application signing key 318 and the encryption key 302 from the mobile device 102. In some examples, instead of receiving the encryption key 302 from the mobile device 102, the hardware wallet device 110 stores a copy of the encryption key 302. For example, the mobile device 102 and the hardware wallet device 110 can each store a copy of a key-encryption key. The mobile device 102 can use the key-encryption key to wrap the application signing key, and the hardware wallet device 110 can use the key-encryption key to unwrap the application signing key. The mobile device 102 can output authentication information for the hardware mobile device 102, such as a device credential, to the hardware wallet device 110. In some examples, the hardware mobile device 102 can output the authentication information with the encrypted application signing key 318.

At step 452, the hardware wallet device 110 authenticates the mobile device 102. For example, the hardware wallet device 110 can use the authenticator 122 to authenticate the mobile device 102 using the authentication information provided by the mobile device 102. The hardware wallet device 110 can authenticate the mobile device 102, for example, by comparing the authentication information to stored authentication information for the mobile device 102, by comparing the information to authentication information previously received from the mobile device 102, or any combination of these.

At step 454, the hardware wallet device 110 decrypts 420 the encrypted application signing key 318 using the encryption key 302. For example, the hardware wallet device 110 can decrypt the encrypted application signing key 318 using the encryption key 302 that was received from the mobile device 102, or that was stored by the hardware wallet device 110. In some examples, the encryption key 302 is a key-encryption key, and the hardware wallet device 110 unwraps the encrypted application signing key 318 using the key-encryption key.

At step 456, the hardware wallet device 110 generates the descriptor 150 for the application signing key 318 and for the hardware signing key 118. For example, the descriptor can include a function, a derivation path, and identifying information for the application signing key 108 and the hardware signing key 118. The hardware wallet device 110 outputs the descriptor 150 to the mobile device 102. For example, the hardware wallet device 110 can send the descriptor 150 to the mobile device 102 over NFC.

In some implementations, the hardware wallet device 110 encrypts the descriptor 150 before sending the descriptor 150 to the mobile device 102. For example, the hardware wallet device 110 can encrypt the descriptor with the encryption key 302 or with another encryption key or wrapping key. Upon receipt of the encrypted descriptor 150, the mobile device 102 can decrypt the descriptor 150. For example, the mobile device 102 can decrypt the descriptor 150 with the encryption key or with an open-source recovery tool. In some implementations, the descriptor 150 can be in a standard script format, enabling use of an open-source recovery tool to decrypt the descriptor 150.

In some implementations, the hardware wallet device 110 outputs the descriptor 150 by activating an NFC mode in which the hardware wallet device 110 transmits the descriptor 150 over NFC. For example, in response to being positioned within a threshold distance from the mobile device 102, the hardware wallet device 110 can activate the NFC mode to communicate with the mobile device 102. The hardware wallet device 110 can maintain the NFC mode for a preset time duration or until the hardware wallet device 110 receives a confirmation 458 of receipt of the descriptor 150 from the mobile device 102. For example, the hardware wallet device 110 can maintain the NFC mode for preset time duration of 10 seconds, twenty seconds, thirty seconds, etc.

Upon receiving the confirmation 458 from the mobile device 102, the hardware wallet device 110 exits export mode 460. In some examples, after exiting export mode 460, the hardware wallet device 110 can re-enter a normal mode in which the hardware wallet device 110 generates hardware signatures. For example, the hardware wallet device 110 can be associated with multiple cryptocurrency addresses. After exporting a descriptor for one of the multiple cryptocurrency addresses, the hardware wallet device 110 can re-enter a normal mode for authenticating transactions for the other cryptocurrency addresses.

In some implementations, after exiting export mode 460, the hardware wallet device 110 does not re-enter a normal mode in which the hardware wallet device 110 generates hardware signatures. For example, the hardware wallet device 110 can be configured such that operation in the export mode prohibits later operation in a normal mode. In some examples, after operation in the export mode, the hardware wallet device 110 can disable itself such that the hardware wallet device 110 is no longer operable to authenticate cryptocurrency transactions.

At step 462, the mobile device 102 stores the descriptor 150. At step 464, the mobile device 102 receives a request to move the descriptor 150 to a new mobile wallet, such as new mobile wallet 131. At step 466, the mobile device 102 moves the descriptor 150 to the new mobile wallet.

Figure 5:
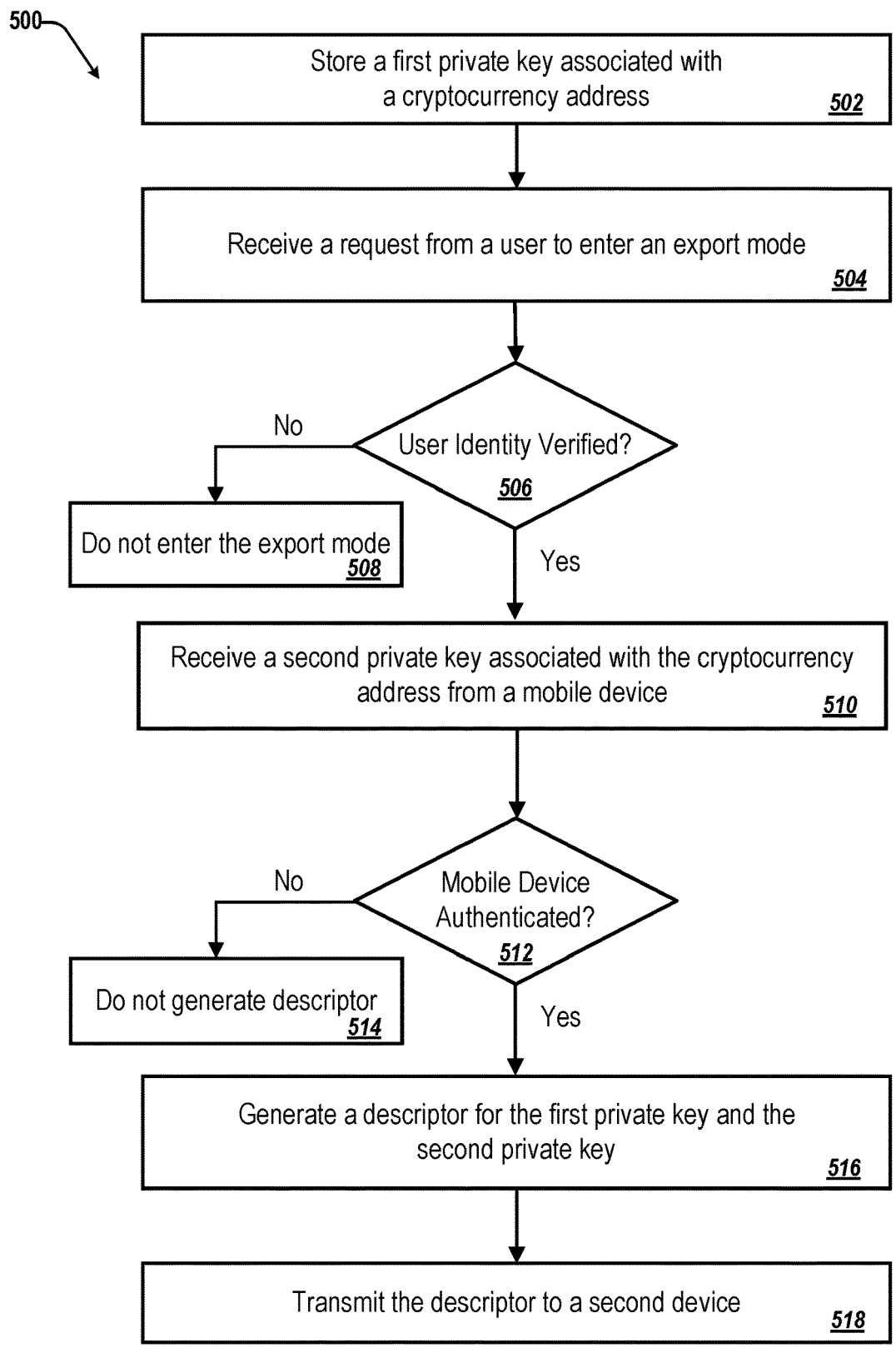
FIG. 5 is a flow diagram of an example process for managing cryptocurrency access in an export mode of operation, according to some implementations of the present subject matter.

FIG. 5 is a flow diagram of an example process 500 for managing cryptocurrency access in an export mode of operation. The process 500 can be performed by the hardware wallet device of the system 100. Steps of the process 500 may occur in the illustrated sequence, or in a sequence that is different from the illustrated sequence. For example, steps may occur concurrently or in a different order than shown in FIG. 5.

The process 500 includes storing a first private key associated with a cryptocurrency address (502). For example, as part of enabling a normal mode of operations, the hardware wallet device 110 can store a hardware signing key 118 associated with the cryptocurrency address 138 of the cryptocurrency network 130.

The process 500 includes receiving a request from a user to enter an export mode (504). For example, the hardware wallet device 110 can receive the request from the user 101 to enter the export mode. The hardware wallet device 110 can receive the request as user input directly to the hardware wallet device 110, such as through interaction of the user with the biometric sensor 121 or other component of the hardware wallet device, e.g., as described above in FIG. 3. The hardware wallet device 110 can receive the request indirectly from the user input, such as in the form of an export mode notification 446 output from the mobile device 102.

The process 500 includes verifying a user identity (506). For example, the hardware wallet device 110 can include the identity verifier 124 that stores information that can be used to verify a user's identity. The hardware wallet device 110 can obtain biometric input from the user 101 through the biometric sensor 121, and the identity verifier 124 can compare the biometric input to the stored biometric information. The identity verifier 124 can then determine whether the user 101 is authorized to initiate transactions with the cryptocurrency address 138. In some examples, the hardware wallet device 110 can verify the user identity using other identifying information in addition to, or instead of, the biometric input. The other identifying information can include, for example, a PIN, a passcode, a password, or other user input.

The process 500 includes determining not to enter the export mode in response to determining that the user identity is not verified (508). For example, the hardware wallet device 110 can determine that the user 101 did not provide adequate credentials to identify themself to the hardware wallet device 110. In some examples, the hardware wallet device 110 can determine that the user 101 did not provide identifying information within a specified time limit. In some examples, the hardware wallet can determine that the user provided identifying information that did not match the stored identifying information within a threshold similarity. In response, the hardware wallet device 110 can determine not to enter the export mode.

The process 500 includes receiving, from a mobile device, a second private key associated with the cryptocurrency address in response to verifying the user identity (510). For example, in response to determining that the user identity is verified, the hardware wallet device 110 can activate NFC in order to obtain the application signing key 108 from the mobile device 102.

The process 500 includes authenticating the mobile device (512). For example, the hardware wallet device 110 includes an authenticator 122 that authenticates whether the second private key was sent from the mobile device 102. The mobile device 102 can send authenticating information to the hardware wallet device 110. The authenticating information can include, for example, credential information that identifies the mobile device. The authenticating information can be used to authenticate the mobile device to the hardware wallet device 110 using the authenticator 122.

The process 500 includes determining not to generate a descriptor in response to determining that the mobile device is not authenticated (514). For example, the hardware wallet device 110 can determine that the mobile device 102 did not provide timely or adequate credentials to authenticate itself to the hardware wallet device 110. In response, the hardware wallet device 110 can determine not to generate the descriptor 150.

The process 500 includes generating a descriptor for the first private key and the second private key in response to authenticating the mobile device (516). For example, the hardware wallet device 110 generates the descriptor 150 for the application signing key 108 and the hardware signing key 118.

The process 500 includes transmitting the descriptor to a second device (518). In some examples, the second device is the mobile device. In some examples, the second device is another hardware wallet device or another computing device.

Figure 6:
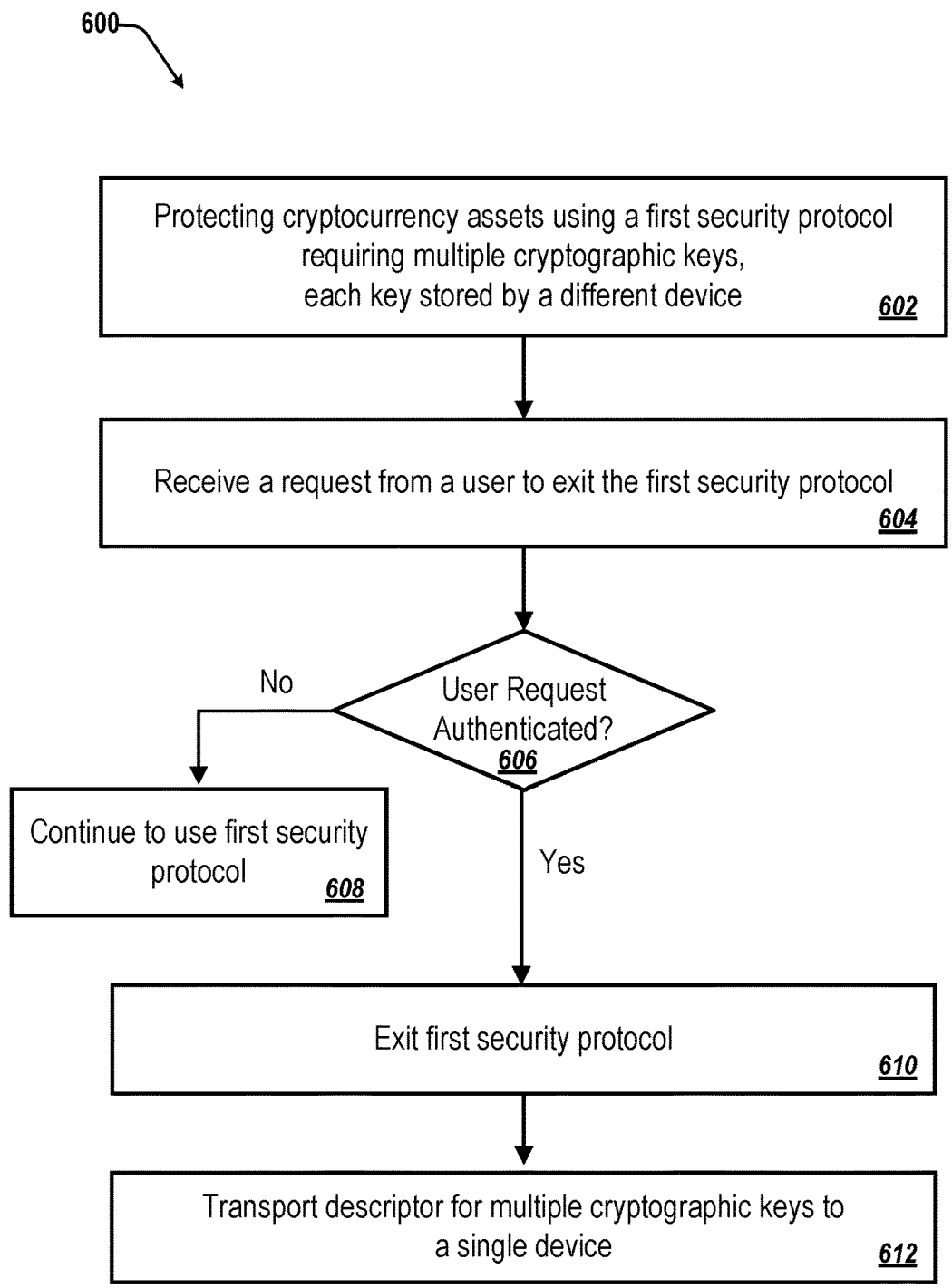
FIG. 6 is a flow diagram of an example process for exiting a security protocol for managing cryptocurrency assets, according to some implementations of the present subject matter.

FIG. 6 is a flow diagram of an example process 600 for exiting a security protocol for managing cryptocurrency assets. In the first security protocol, the hardware wallet device can operate in a first, normal mode. To exit the first security protocol, the hardware wallet device can operate in a second, export mode. The process 600 can be performed by any combination of the mobile device 102, the hardware wallet device 110, or the server 120 of the system 100. Steps of the process 600 may occur in the illustrated sequence, or in a sequence that is different from the illustrated sequence. For example, steps may occur concurrently or in a different order than shown in FIG. 6.

The process 600 includes protecting cryptocurrency assets using a first security protocol requiring multiple cryptographic keys, each key stored by a different device (602). For example, referring to FIG. 1B, the multiple cryptographic keys include the application signing key 108, the hardware signing key 118, and the server signing key 126. The application signing key 108 is stored by the mobile device 102, and may be backed up to a cloud server (e.g., the cloud server 320 shown in FIG. 3). The hardware signing key 118 is stored by the hardware wallet device 110. The server signing key 126 is stored by the server 120. In general, the user 101 has access to and control over the mobile device 102 and the hardware wallet device 110. The service provider of the application 115 has access to and control over the server 120. Although FIG. 1B depicts three cryptographic keys, more or fewer cryptographic keys are possible.

The process 600 includes receiving a request from a user to exit the first security protocol (604). For example, the user 101 can provide input to the mobile device 102, to the hardware wallet device 110 or both, to request initiating of an export mode. Initiating the export mode causes the system 100 to exit the first security protocol.

The process 600 includes authenticating the user request (606). For example, the mobile device 102, the hardware wallet device 110, or both, can obtain user identifying information in order to verify the identity of the user requesting to exit the first security protocol. In some examples, the user request to exit the first security protocol is received indirectly (e.g., is received by the hardware wallet device 110 from the mobile device 102). In these examples, authenticating the use request includes authenticating the device from which the request was received. For example, the user can provide input to the mobile device 102 to request to exit the first security protocol, the mobile device 102 can send an export mode notification 446 to the hardware wallet device 110, and in response, the hardware wallet device 110 can authenticate the user request by authenticating mobile device 102.

The process 600 includes continuing to use the first security protocol in response to determining that the user request is not authenticated (608). For example, the hardware wallet device 110 may determine that the user's identity could not be verified, that the mobile device 102 could not be authenticated, or both. In response, the hardware wallet device 110 can continue to protect the cryptocurrency assets using the first security protocol.

The process 600 includes exiting the first security protocol in response to authenticating the user request (610). For example, the hardware wallet device 110 can determine that the user's identity is verified, that the mobile device 102 is authenticated, or both. In response, the hardware wallet device 110 can determine to exit the first security protocol.

The process 600 includes transporting a descriptor for multiple cryptographic keys to a single device (612). For example, the hardware wallet device 110 can generate a descriptor for multiple cryptographic keys, such as the hardware signing key 118 and the application signing key 108. The hardware wallet device 110 can output the descriptor to a single device, such as the mobile device 102, another hardware wallet device 110, or another computing device.

Figure 7:
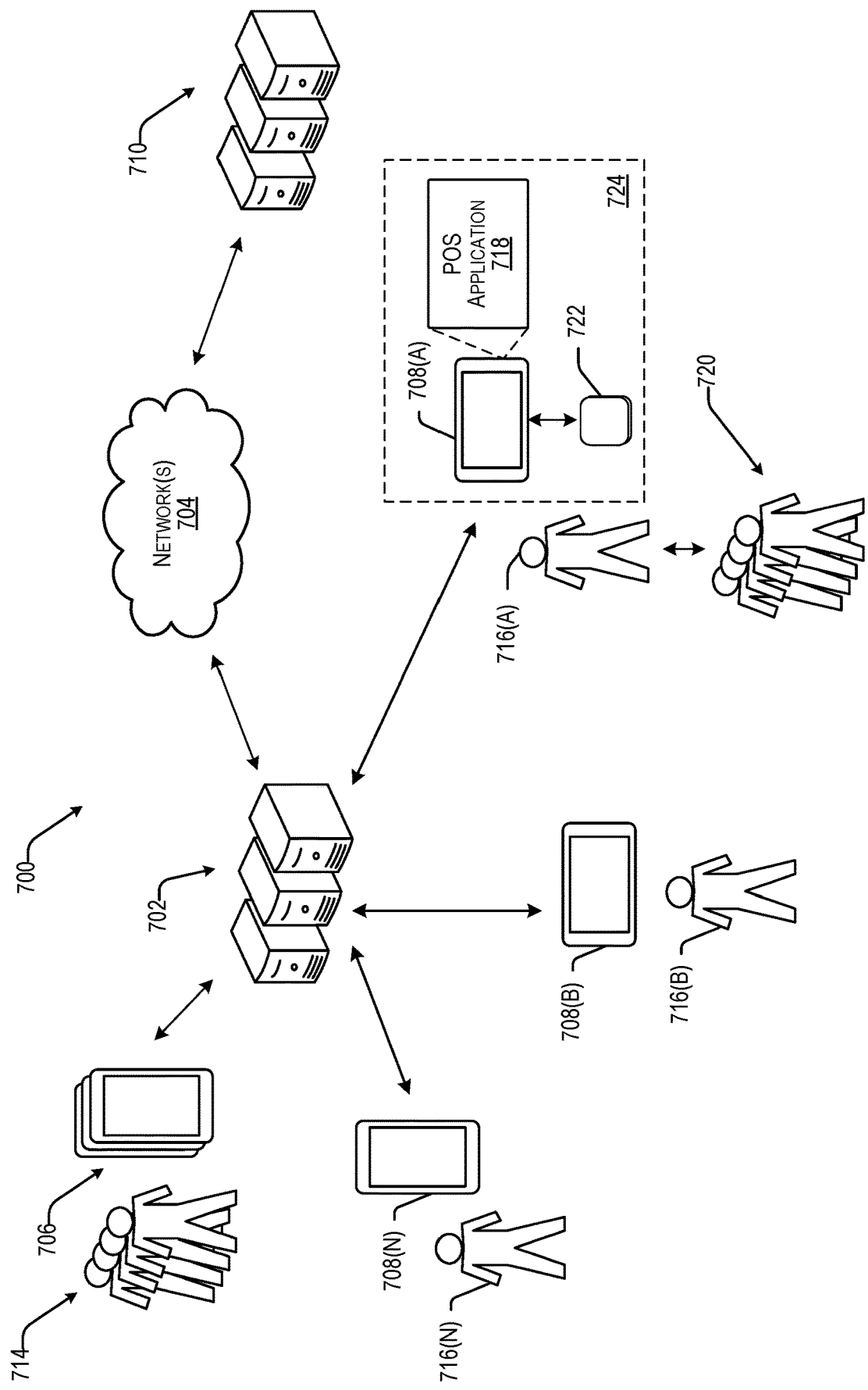
FIG. 7 illustrates an example payment processing environment.

FIG. 7 illustrates an example payment processing environment 700. The environment 700 includes server(s) 702 that can communicate over a network 704 with user devices 706 (which, in some examples can be merchant devices 708 (individually, 708(A)-708(N))) and/or server(s) 710 associated with third-party service provider(s). The server(s) 702 can be associated with a service provider that can provide one or more services for the benefit of users 714, as described below. Actions attributed to the service provider can be performed by the server(s) 702.

The user devices 708 can include, for example, the mobile device 102 and the mobile device 142 of the system 100, shown in FIG. 1B. The servers 702 can include, for example, the server 120 of the system 100.

The environment 700 can include a plurality of user devices 706, as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 714. The users 714 can be referred to as customers, buyers, merchants, sellers, borrowers, employees, employers, payors, payees, couriers and so on. The users 714 can interact with the user devices 706 via user interfaces presented via the user devices 706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

As described above, in at least one example, the users 714 can include merchants 716 (individually, 716(A)-716(N)). In an example, the merchants 716 can operate respective merchant devices 708, which can be user devices 706 configured for use by merchants 716. For the purpose of this discussion, a "merchant" can be any entity that offers items (e.g., goods or services) for purchase or other means of acquisition (e.g., rent, borrow, barter, etc.). The merchants 716 can offer items for purchase or other means of acquisition via brick-and-mortar stores, mobile stores (e.g., pop-up shops, food trucks, etc.), online stores, combinations of the foregoing, and so forth. In some examples, at least some of the merchants 716 can be associated with a same entity but can have different merchant locations and/or can have franchise/franchisee relationships. In additional or alternative examples, the merchants 716 can be different merchants. That is, in at least one example, the merchant 716(A) is a different merchant than the merchant 716(B) and/or the merchant 716(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 708 can have an instance of a POS application 718 stored thereon. The POS application 718 can configure the merchant device 708 as a POS terminal, which enables the merchant 716(A) to interact with one or more customers 720. As described above, the users 714 can include customers, such as the customers 720 shown as interacting with the merchant 716(A). For the purpose of this discussion, a "customer" can be any entity that acquires items from merchants. While only two customers 720 are illustrated in FIG. 7, any number of customers 720 can interact with the merchants 716. Further, while FIG. 7 illustrates the customers 720 interacting with the merchant 716(A), the customers 720 can interact with any of the merchants 716.

In at least one example, interactions between the customers 720 and the merchants 716 that involve the exchange of funds (from the customers 720) for items (from the merchants 716) can be referred to as "transactions." In at least one example, the POS application 718 can determine transaction data associated with the POS transactions. Transaction data can include payment information, which can be obtained from a reader device 722 associated with the merchant device 708(A), user authentication data, purchase amount information, point-of-purchase information (e.g., item(s) purchased, date of purchase, time of purchase, etc.), etc. The POS application 718 can send transaction data to the server(s) 702 such that the server(s) 702 can track transactions of the customers 720, merchants 716, and/or any of the users 714 over time. Furthermore, the POS application 718 can present a UI to enable the merchant 716(A) to interact with the POS application 718 and/or the service provider via the POS application 718.

In at least one example, the merchant device 708(A) can be a special-purpose computing device configured as a POS terminal (via the execution of the POS application 718). In at least one example, the POS terminal may be connected to a reader device 722, which is capable of accepting a variety of payment instruments, such as credit cards, debit cards, gift cards, short-range communication based payment instruments, and the like, as described below. In at least one example, the reader device 722 can plug in to a port in the merchant device 708(A), such as a microphone port, a headphone port, an audio-jack, a data port, or other suitable port. In additional or alternative examples, the reader device 722 can be coupled to the merchant device 708(A) via another wired or wireless connection, such as via a Bluetooth®, BLE, and so on. Additional details are described below with reference to FIG. 7. In some examples, the reader device 722 can read information from alternative payment instruments including, but not limited to, wristbands and the like.

In some examples, the reader device 722 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 722, and communicate with the server(s) 702, which can provide, among other services, a payment processing service. The server(s) 702 associated with the service provider can communicate with server(s) 710, as described below. In this manner, the POS terminal and reader device 722 may collectively process transaction(s) between the merchants 716 and customers 720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 722 of the POS system 724 are shown as separate devices, in additional or alternative examples, the POS terminal and the reader device 722 can be part of a single device. In some examples, the reader device 722 can have a display integrated therein for presenting information to the customers 720. In additional or alternative examples, the POS terminal can have a display integrated therein for presenting information to the customers 720. POS systems, such as the POS system 724, may be mobile, such that POS terminals and reader devices may process transactions in disparate locations across the world. POS systems can be used for processing card-present transactions and card-not-present (CNP) transactions, as described below.

A card-present transaction is a transaction where both a customer 720 and his or her payment instrument are physically present at the time of the transaction. Card-present transactions may be processed by swipes, dips, taps, or any other interaction between a physical payment instrument (e.g., a card), or otherwise present payment instrument, and a reader device 722 whereby the reader device 722 is able to obtain payment data from the payment instrument. A swipe is a card-present transaction where a customer 720 slides a card, or other payment instrument, having a magnetic strip through a reader device 722 that captures payment data contained in the magnetic strip. A dip is a card-present transaction where a customer 720 inserts a payment instrument having an embedded microchip (i.e., chip) into a reader device 722 first. The dipped payment instrument remains in the payment reader until the reader device 722 prompts the customer 720 to remove the card, or other payment instrument. While the payment instrument is in the reader device 722, the microchip can create a one-time code which is sent from the POS system 724 to the server(s) 710 (which can be associated with third-party service providers that provide payment services, including but not limited to, an acquirer bank, an issuer, and/or a card payment network (e.g., Mastercard®, VISAR, etc.)) to be matched with an identical one-time code. A tap is a card-present transaction where a customer 720 may tap or hover his or her payment instrument (e.g., card, electronic device such as a smart phone running a payment application, etc.) over a reader device 722 to complete a transaction via short-range communication (e.g., NFC, RFID, Bluetooth®, BLE, etc.). Short-range communication enables the payment instrument to exchange information with the reader device 722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 724, the server(s) 702, and/or the server(s) 710 may exchange payment information and transaction data to determine whether transactions are authorized. For example, the POS system 724 may provide encrypted payment data, user authentication data, purchase amount information, point-of-purchase information, etc. (collectively, transaction data) to server(s) 702 over the network(s) 704. The server(s) 702 may send the transaction data to the server(s) 710. As described above, in at least one example, the server(s) 710 can be associated with third-party service providers that provide payment services, including but not limited to, an acquirer bank, an issuer, and/or a card payment network (e.g., Mastercard®, VISAR, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 710 associated therewith) can send a fund transfer request to a server computing device of a card payment network (e.g., Mastercard®, VISAR, etc.) to determine whether the transaction is authorized or deficient. In at least one example, the service provider can serve as an acquirer and connect directly with the card payment network.

The card payment network (e.g., the server(s) 710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 710 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 710 associated therewith), and a payment authorization message is communicated from the issuer to the POS device via a path opposite of that described above, or via an alternate path.

As described above, the server(s) 710, which can be associated with payment service provider(s), may determine whether the transaction is authorized based on the transaction data, as well as information relating to parties to the transaction (e.g., the customer 720 and/or the merchant 716(A)). The server(s) 710 may send an authorization notification over the network(s) 704 to the server(s) 702, which may send the authorization notification to the POS system 724 over the network(s) 704 to indicate whether the transaction is authorized. The server(s) 702 may also transmit additional information such as transaction identifiers to the POS system 724. In one example, the server(s) 702 may include a merchant application and/or other functional components for communicating with the POS system 724 and/or the server(s) 710 to authorize or decline transactions.

Based on the authentication notification that is received by the POS system 724 from server(s) 702, the merchant 716(A) may indicate to the customer 720 whether the transaction has been approved. In some examples, approval may be indicated at the POS system 724, for example, at a display of the POS system 724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 714 can access all of the services of the service provider. In other examples, the users 714 can have gradated access to the services, which can be based on risk tolerance, IDV outputs, subscriptions, and so on. In at least one example, access to such services can be availed to the merchants 716 via the POS application 718. In additional or alternative examples, each service can be associated with its own access point (e.g., application, web browser, etc.).

The service provider can offer payment processing services for processing payments on behalf of the merchants 716, as described above. For example, the service provider can provision payment processing software, payment processing hardware and/or payment processing services to merchants 716, as described above, to enable the merchants 716 to receive payments from the customers 720 when conducting POS transactions with the customers 720. For instance, the service provider can enable the merchants 716 to receive cash payments, payment card payments, and/or electronic payments from customers 720 for POS transactions and the service provider can process transactions on behalf of the merchants 716.

As the service provider processes transactions on behalf of the merchants 716, the service provider can maintain accounts or balances for the merchants 716 in one or more ledgers. For example, the service provider can analyze transaction data received for a transaction to determine an amount of funds owed to a merchant 716(A) for the transaction. In at least one example, such an amount can be a total purchase price less fees charged by the service provider for providing the payment processing services. Based on determining the amount of funds owed to the merchant 716(A), the service provider can deposit funds into an account of the merchant 716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 716(A) to a bank account of the merchant 716(A) that is held at a bank or other financial institution (e.g., associated with the server(s) 710). Scheduled deposits can occur at a prearranged time after a POS transaction is funded, which can be a business day after the POS transaction occurred, or sooner or later. In some examples, the merchant 716(A) can access funds prior to a scheduled deposit. For instance, the merchant 716(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 716(A) can have a payment instrument that is linked to the stored balance that enables the merchant to access the funds without first transferring the funds from the account managed by the service provider to the bank account of the merchant 716(A).

In at least one example, the service provider may provide inventory management services. That is, the service provider may provide inventory tracking and reporting. Inventory management services may enable the merchant 716(A) to access and manage a database storing data associated with a quantity of each item that the merchant 716(A) has available (i.e., an inventory). Furthermore, in at least one example, the service provider can provide catalog management services to enable the merchant 716(A) to maintain a catalog, which can be a database storing data associated with items that the merchant 716(A) has available for acquisition (i.e., catalog management services). In at least one example, the catalog may include a plurality of data items and a data item of the plurality of data items may represent an item that the merchant 716(A) has available for acquisition. The service provider can offer recommendations related to pricing of the items, placement of items on the catalog, and multi-party fulfillment of the inventory.

In at least one example, the service provider can provide business banking services, which allow the merchant 716(A) to track deposits (from payment processing and/or other sources of funds) into an account of the merchant 716(A), payroll payments from the account (e.g., payments to employees of the merchant 716(A)), payments to other merchants (e.g., business-to-business) directly from the account or from a linked debit card, withdrawals made via scheduled deposit and/or instant deposit, etc. Furthermore, the business banking services can enable the merchant 716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 716. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products.

For example, in one implementation, the server provider 712 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 714 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 716. In at least one example, the service provider can recommend and/or generate content items to supplement omni-channel presences of the merchants 716. That is, if a merchant of the merchants 716 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 714 to set schedules for scheduling appointments and/or users 714 to schedule appointments.

In some examples, the service provider can provide restaurant management services to enable users 714 to make and/or manage reservations, to monitor front-of-house and/or back-of-house operations, and so on. In such examples, the merchant device(s) 708 and/or server(s) 702 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 714 who can travel between locations to perform services for a requesting user 714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 706.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 714, voice inputs into a virtual assistant or the like, to determine intents of user(s) 714. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 714 may be new to the service provider such that the user 714 that has not registered (e.g., subscribed to receive access to one or more services offered by the service provider) with the service provider. The service provider can offer onboarding services for registering a potential user 714 with the service provider. In some examples, onboarding can involve presenting various questions, prompts, and the like to a potential user 714 to obtain information that can be used to generate a profile for the potential user 714. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 714 providing all necessary information, the potential user 714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 710). That is, the service provider can offer IDV services to verify the identity of users 714 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 714 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 702) and/or the server(s) 710 via the network(s) 704. In some examples, the merchant device(s) 708 are not capable of connecting with the service provider (e.g., the server(s) 702) and/or the server(s) 710, due to a network connectivity issue, for example. In additional or alternative examples, the server(s) 702 are not capable of communicating with the server(s) 710 due to network connectivity issue, for example. In such examples, devices may operate in "offline" mode where at least some payment data is stored (e.g., on the merchant device(s) 708) and/or the server(s) 702 until connectivity is restored and the payment data can be transmitted to the server(s) 702 and/or the server(s) 710 for processing.

In at least one example, the service provider can be associated with a hub, such as an order hub, an inventory hub, a fulfillment hub and so on, which can enable integration with one or more additional service providers (e.g., associated with the additional server(s) 710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 706 that are in communication with server(s) 702 of the service provider. That is, techniques described herein are directed to a specific implementation—or, a practical application—of utilizing a distributed system of user devices 706 that are in communication with server(s) 702 of the service provider to perform a variety of services, as described above. The unconventional configuration of the distributed system described herein enables the server(s) 702 that are remotely-located from end-users (e.g., users 714) to intelligently offer services based on aggregated data associated with the end-users, such as the users 714 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 714 and user devices 706. Furthermore, such features are changed dynamically based on the profiles of the users involved interacting with the GUIs. As such, techniques described herein are directed to improvements to computing systems.

Figure 8:
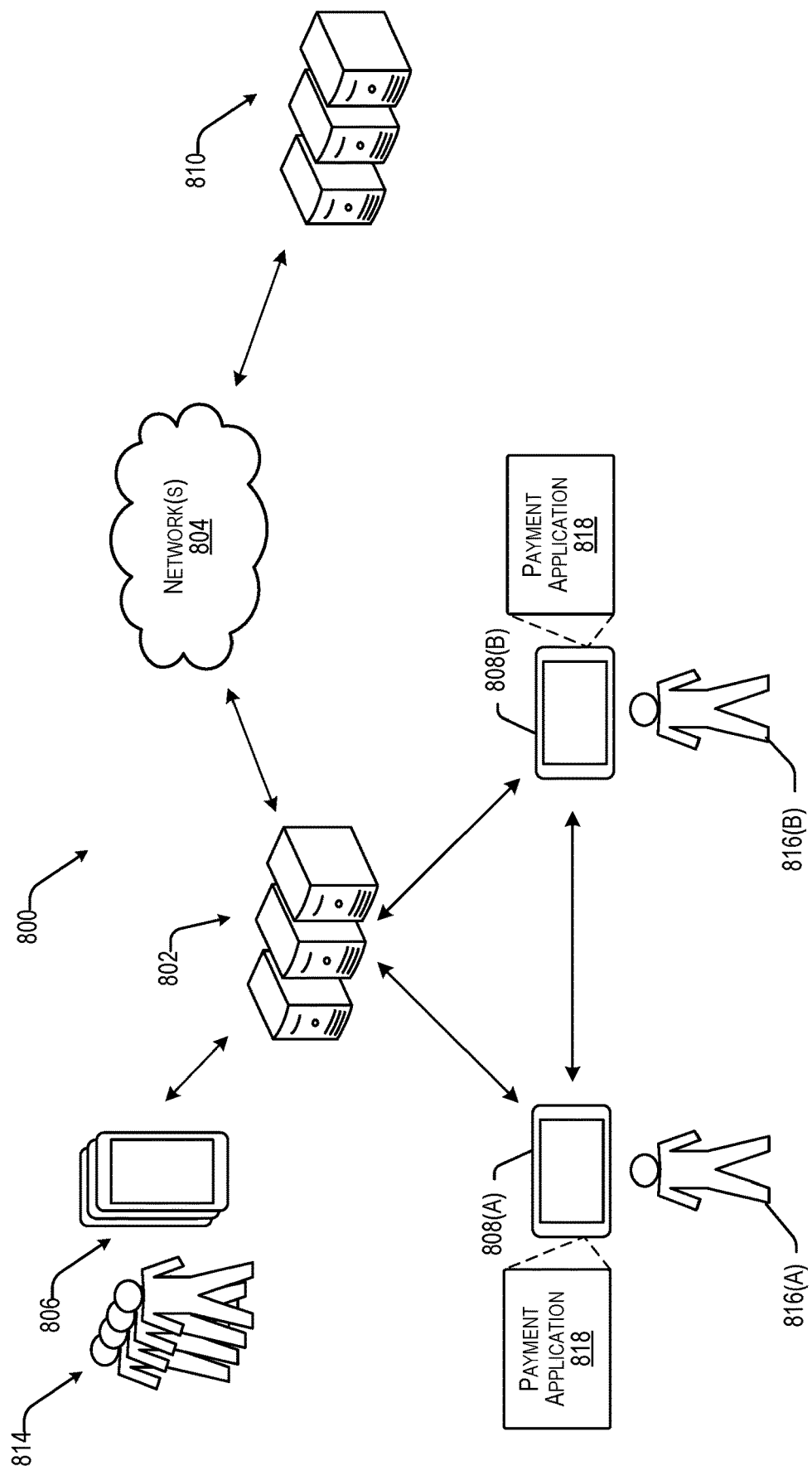
FIG. 8 illustrates an example peer-to-peer payment making environment.

FIG. 8 illustrates an example peer-to-peer payment making environment 800. The environment 800 includes server(s) 802 that can communicate over a network 804 with user devices 806 (which, in some examples can be user devices 808 (individually, 808(A), 808(B)) and/or server(s) 810 associated with third-party service provider(s). The server(s) 802 can be associated with a service provider that can provide one or more services for the benefit of users 814, as described below. Actions attributed to the service provider can be performed by the server(s) 802. In some examples, the service provider referenced in FIG. 7 can be the same or different than the service provider referenced in FIG. 8.

The user devices 808 can include, for example, the mobile device 102 and the mobile device 142 of the system 100, shown in FIG. 1B. The servers 802 can include, for example, the server 120 of the system 100.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In at least one example, the service provider can provide a peer-to-peer payment service that enables peer-to-peer payments between two or more users 814. Two users, user 816(A) and user 816(B) are illustrated in FIG. 8 as "peers" in a peer-to-peer payment. In at least one example, the service provider can communicate with instances of a payment application 818 (or other access point) installed on devices 806 configured for operation by users 814. The application 818 can be, for example, the application 115 of the system 100. In an example, an instance of the payment application 818 executing on a first device 808(A) operated by a payor (e.g., user 816(A)) can send a request to the service provider to transfer an asset (e.g., fiat currency, non-fiat currency, digital assets, cryptocurrency, securities, gift cards, and/or related assets) from the payor to a payee (e.g., user 816(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 9:
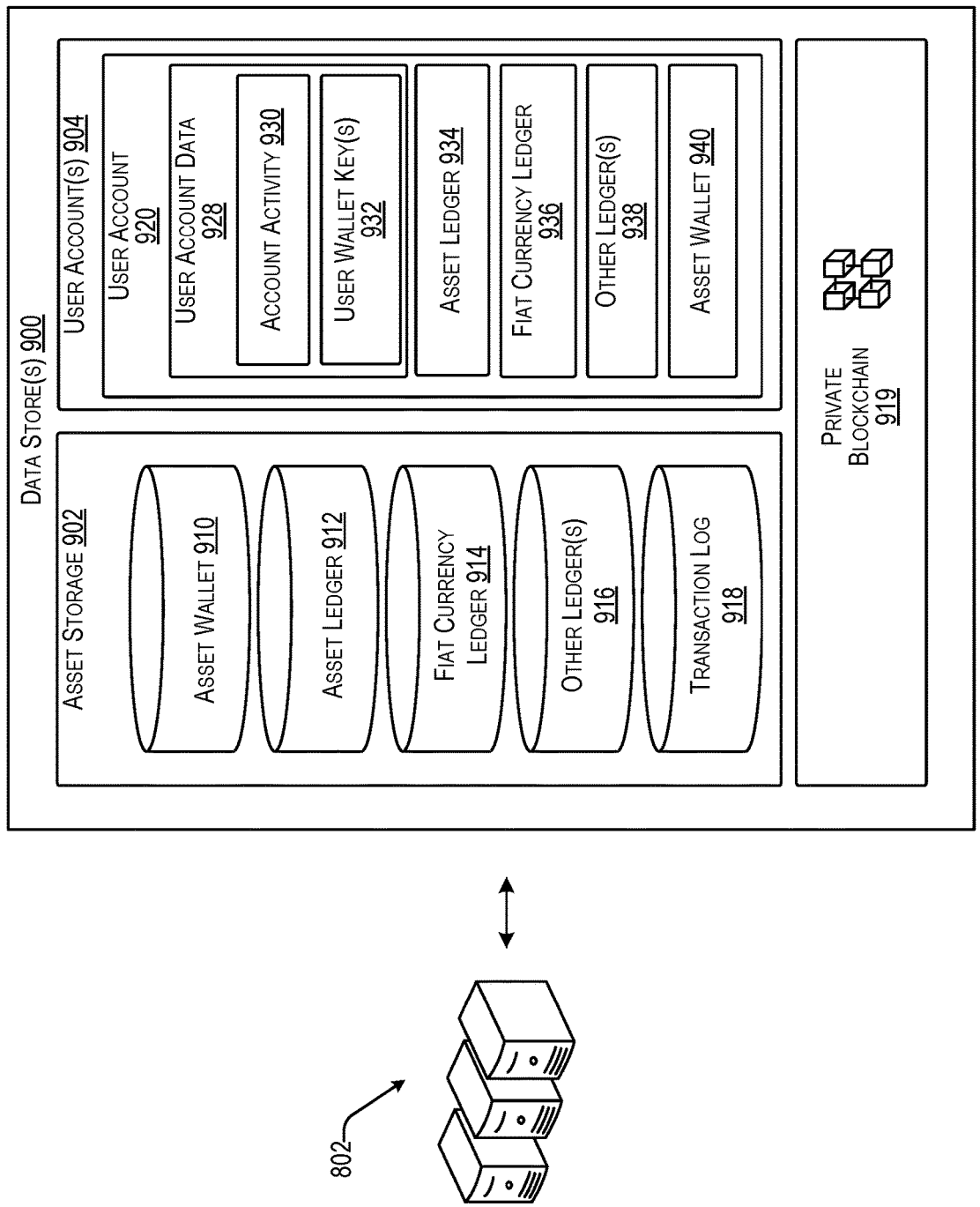
FIG. 9 illustrates example data stores that can be associated with the environments of FIGS. 7 and 8.

In some examples, the service provider can utilize a ledger system to track transfers of assets between users 814. FIG. 9, below, provides additional details associated with such a ledger system. The ledger system can enable users 814 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 818 executing on user device(s) of payee(s). As an example, the service provider can transfer assets from an account of user 816(A) to an account of the user 816(B) and can send a notification to the user device 808(B) of the user 816(B) for presentation via a user interface. The notification can indicate that a transfer is in process, a transfer is complete, or the like. In some examples, the service provider can send additional or alternative information to the instances of the payment application 818 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 818 executing on the user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 8 or a third-party service provider associated with the server(s) 810. In examples where the content provider is a third-party service provider, the server(s) 810 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 8. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 806 (e.g., mobile device or conventional personal computer (PC)) based on instructions transmitted to and from the server(s) 802 (which, in such an example can be called a "messaging server"). In some instances, the messaging application can include a payment application with messaging capability that enables users of the payment application to communicate with one another. In such instances, the payment application can be executed on a user device 806 based on instructions transmitted to and from the server(s) 802 (e.g., the payment service discussed in this description or another payment service that supports payment transactions). In some examples, the messaging application can be provided by a third-party service provider associated with the server(s) 810. In examples where the messaging application is a third-party service provider, the server(s) 810 can be accessible via one or more APIs or other integrations.

As described above, the service provider can facilitate peer-to-peer transactions, which can enable users 814 to transfer fiat currency, non-fiat currency, cryptocurrency, securities, or other assets, or portions thereof, to other users 814. In at least one example, individual users can be associated with user accounts. Additional details associated with user accounts and the transfer of assets between users 814 are described below with reference to FIG. 9.

Furthermore, the service provider of FIG. 8 can enable users 814 to perform banking transactions via instances of the payment application 818. For example, users can configure direct deposits or other deposits for adding assets to their various ledgers/balances. Further, users 814 can configure bill pay, recurring payments, and/or the like using assets associated with their accounts. In addition to sending and/or receiving assets via peer-to-peer transactions, users

814 buy and/or sell assets via asset networks such as cryptocurrency networks, securities networks, and/or the like.

FIG. 9 illustrates example data store(s) 900 that can be associated with the server(s) 802 of the environments of FIGS. 7 and 8.

In at least one example, the data store(s) 900 can store assets in an asset storage 902, as well as data in user account(s) 904. In some examples, user account(s) 904 can include merchant account(s) 906, and/or customer account(s) 908. In at least one example, the asset storage 902 can be used to store assets managed by the service provider of FIG. 8. In at least one example, the asset storage 902 can be used to record whether individual of the assets are registered to users. For example, the asset storage 902 can include an asset wallet 910 for storing records of assets owned by the service provider of FIG. 8, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 810 can be associated therewith. In some examples, the asset wallet 910 can communicate with the asset network via one or more components associated with the server(s) 802.

The asset wallet 910 can be associated with one or more addresses and can vary addresses used to acquire assets (e.g., from the asset network(s)) so that its holdings are represented under a variety of addresses on the asset network. In examples where the service provider of FIG. 8 has its own holdings of cryptocurrency (e.g., in the asset wallet 910), a user can acquire cryptocurrency directly from the service provider of FIG. 8. In some examples, the service provider of FIG. 8 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 902 may contain ledgers that store records of assignments of assets to users 814. Specifically, the asset storage 902 may include asset ledger 912, fiat currency ledger 914, and other ledger(s) 916, which can be used to record transfers of assets between users 814 of the service provider and/or one or more third-parties (e.g., merchant network(s), payment card network(s), ACH network(s), equities network(s), the asset network, securities networks, etc.). In doing so, the asset storage 902 can maintain a running balance of assets managed by the service provider of FIG. 8. The ledger(s) of the asset storage 902 can further indicate some of the running balance for each of the ledger(s) stored in the asset storage 902 is assigned or registered to one or more user account(s) 904.

In at least one example, the asset storage 902 can include transaction logs 918, which can include records of past transactions involving the service provider of FIG. 8. In at least one example, transaction data, as described herein, can be stored in association with the transaction logs 918.

In some examples, the data store(s) 900 can store a private blockchain 919. A private blockchain 919 can function to record sender addresses, recipient addresses, public keys, values of cryptocurrency transferred, and/or can be used to verify ownership of cryptocurrency tokens to be transferred. In some examples, the service provider of FIG. 8 can record transactions taking place within the service provider of FIG. 8 involving cryptocurrency until the number of transactions has exceeded a determined limit (e.g., number of transactions, storage space allocation, etc.). Based at least in part on determining that the limit has been reached, the service provider of FIG. 8 can publish the transactions in the private blockchain 919 to a public blockchain (e.g., associated with the asset network), where miners can verify the transactions and record the transactions to blocks on the public blockchain. In at least one example, the service provider of FIG. 8 can participate as miner(s) at least for its transactions to be posted to the public blockchain.

In at least one example, the data store(s) 900 can store and/or manage accounts, such as user account(s) 904, merchant account(s) 906, and/or customer account(s) 908. In at least one example, the user account(s) 904 may store records of user accounts associated with the users 814. In at least one example, the user account(s) 904 can include a user account 920, which can be associated with a user (of the users 814). Other user accounts of the user account(s) 904 can be similarly structured to the user account 920, according to some examples. In other examples, other user accounts may include more or less data and/or account information than that provided by the user account 920. In at least one example, the user account 920 can include user account data 928, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 928 can include account activity 930 and user wallet key(s) 932. The account activity 930 may include a transaction log for recording transactions associated with the user account 920. In some examples, the user wallet key(s) 932 can include a public-private key-pair and a respective address associated with the asset network or other asset networks. In some examples, the user wallet key(s) 932 may include one or more key pairs, which can be unique to the asset network or other asset networks.

In addition to the user account data 928, the user account 920 can include ledger(s) for account(s) managed by the service provider of FIG. 8, for the user. For example, the user account 920 may include an asset ledger 934, a fiat currency ledger 936, and/or one or more other ledgers 938. The ledger(s) can indicate that a corresponding user utilizes the service provider of FIG. 8 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 8.

In some examples, the asset ledger 934 can store a balance for each of one or more cryptocurrencies (e.g., Bitcoin, Ethereum, Litecoin, etc.) registered to the user account 920. In at least one example, the asset ledger 934 can further record transactions of cryptocurrency assets associated with the user account 920. For example, the user account 920 can receive cryptocurrency from the asset network using the user wallet key(s) 932. In some examples, the user wallet key(s) 932 may be generated for the user upon request. User wallet key(s) 932 can be requested by the user in order to send, exchange, or otherwise control the balance of cryptocurrency held by the service provider of FIG. 8 (e.g., in the asset wallet 910) and registered to the user. In some examples, the user wallet key(s) 932 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 8 and the value is credited as a balance in asset ledger 934), by purchasing currency in the form associated with the account using currency in a different form (e.g., buying a value of cryptocurrency from the service provider of FIG. 8 using a value of fiat currency reflected in fiat currency ledger 936, and crediting the value of cryptocurrency in asset ledger 934), or by conducting a transaction with another user (customer or merchant) of the service provider of FIG. 8 wherein the account receives incoming currency (which can be in the form associated with the account or a different form, in which the incoming currency may be converted to the form associated with the account). In some examples, the user account data 928 can include preferences for maintaining balances of individual of the ledgers. For example, the service provider of FIG. 8 can automatically debit the fiat currency ledger 936 to increase the asset ledger 934, or another account associated with the user whenever the cryptocurrency balance (e.g., of the asset ledger 934) falls below a stated level (e.g., a threshold). Conversely, in some embodiments, the service provider of FIG. 8 can automatically credit the fiat currency ledger 936 to decrease the asset ledger 934 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 8 (i.e., an external account). In at least one example, the user can transfer all or a portion of a balance of the cryptocurrency stored in the third-party cryptocurrency wallet to the service provider of FIG. 8. Such a transaction can require the user to transfer an amount of the cryptocurrency in a message signed by user's private key to an address provided by the service provider of FIG. 8. In at least one example, the transaction can be sent to miners to bundle the transaction into a block of transactions and to verify the authenticity of the transactions in the block. Once a miner has verified the block, the block is written to a public, distributed blockchain where the service provider of FIG. 8 can then verify that the transaction has been confirmed and can credit the user's asset ledger 934 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 8. As described above, in some examples, the service provider of FIG. 8 can acquire cryptocurrency from a third-party source. In such examples, the asset wallet 910 can be associated with different addresses and can vary addresses used to acquire cryptocurrency so that its holdings are represented under a variety of addresses on a blockchain. When the service provider of FIG. 8 has their own holdings of cryptocurrency, users can acquire cryptocurrency directly from the service provider of FIG. 8. In some examples, the service provider of FIG. 8 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 8 has its own cryptocurrency assets, cryptocurrency transferred in a transaction (e.g., data with address provided for receipt of transaction and a balance of cryptocurrency transferred in the transaction) can be stored in the asset wallet 910. In at least one example, the service provider of FIG. 8 can credit the asset ledger 934 of the user. Additionally, while the service provider of FIG. 8 recognizes that the user retains the value of the transferred cryptocurrency through crediting the asset ledger 934, any person that inspects the blockchain will see the cryptocurrency as having been transferred to the service provider of FIG. 8. In some examples, the asset wallet 910 can be associated with many different addresses. In such examples, any person that inspects the blockchain may not easily associate all cryptocurrency stored in asset wallet 910 as belonging to the same entity. It is this presence of a private ledger that is used for real-time transactions and maintained by the service provider of FIG. 8, combined with updates to the public ledger at other times, that allows for extremely fast transactions using cryptocurrency to be achieved. In some examples, the "private ledger" can refer to the asset ledger 910, which in some examples, can utilize the private blockchain 919, as described herein. The "public ledger" can correspond to a public blockchain associated with the asset network.

In at least one example, a user's asset ledger 934, fiat currency ledger 936, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 934. In some examples, a user can receive fiat currency or another currency in the form of payment for a transaction with another user. In at least one example, at least a portion of such funds can be converted into cryptocurrency by the service provider of FIG. 8 and used to fund the asset ledger 934 of the user.

As addressed above, in some examples, users can also have other accounts maintained by the service provider of FIG. 8. For example, a user can also have an account in U.S. dollars, which can be tracked, for example, via the fiat currency ledger 936. Such an account can be funded by transferring money from a bank account at a third-party bank to an account maintained by the service provider of FIG. 8 as is conventionally known. In some examples, a user can receive fiat currency in the form of payment for a transaction with another user. In such examples, at least a portion of such funds can be used to fund the fiat currency ledger 936.

In some examples, a user can have one or more internal payment cards registered with the service provider of FIG. 8. Internal payment cards can be linked to one or more of the accounts associated with the user account 920. In some embodiments, options with respect to internal payment cards can be adjusted and managed using an application (e.g., the payment application 818).

In at least one example, as described above, each ledger can correspond to an account of the user that is managed by the service provider of FIG. 8. In at least one example, individual of the accounts can be associated with a wallet or a stored balance for use in payment transactions, peer-to-peer transactions, payroll payments, etc.

In at least one example, the user account 920 can be associated with an asset wallet 940. The asset wallet 940 of the user can be associated with account information that can be stored in the user account data 928 and, in some examples, can be associated with the user wallet key(s) 932. In at least one example, the asset wallet 940 can store data indicating an address provided for receipt of a cryptocurrency transaction. In at least one example, the balance of the asset wallet 940 can be based at least in part on a balance of the asset ledger 934. In at least one example, funds availed via the asset wallet 940 can be stored in the asset wallet 940 or the asset wallet 910. Funds availed via the asset wallet 910 can be tracked via the asset ledger 934. The asset wallet 940, however, can be associated with additional cryptocurrency funds.

In at least one example, when the service provider of FIG. 8 includes a private blockchain 919 for recording and validating cryptocurrency transactions, the asset wallet 940 can be used instead of, or in addition to, the asset ledger 934. For example, at least one example, a merchant can provide the address of the asset wallet 940 for receiving payments. In an example where a customer is paying in cryptocurrency and the customer has their own cryptocurrency wallet account associated with the service provider of FIG. 8, the customer can send a message signed by its private key including its wallet address (i.e., of the customer) and identifying the cryptocurrency and value to be transferred to the merchant's asset wallet 940. The service provider of FIG. 8 can complete the transaction by reducing the cryptocurrency balance in the customer's cryptocurrency wallet and increasing the cryptocurrency balance in the merchant's asset wallet 940. In addition to recording the transaction in the respective cryptocurrency wallets, the transaction can be recorded in the private blockchain 919 and the transaction can be confirmed. A user can perform a similar transaction with cryptocurrency in a peer-to-peer transaction as described above. In at least one example, the cryptocurrency wallet account 930 can be funded by a balance transfer from a third-party cryptocurrency wallet, as described above. Such a transaction can require a user to transfer an amount of cryptocurrency in a message signed by the user's private key to an address of the cryptocurrency wallet account 930. The transferred amount of cryptocurrency can then be within the cryptocurrency wallet account 930 for use in later transactions.

While the asset ledger 934 and/or asset wallet 940 are each described above with reference to cryptocurrency, the asset ledger 934 and/or asset wallet 940 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 8 is an aspect of the technology disclosed that enables technical advantages of increased processing speed and improved security.

Figure 10:
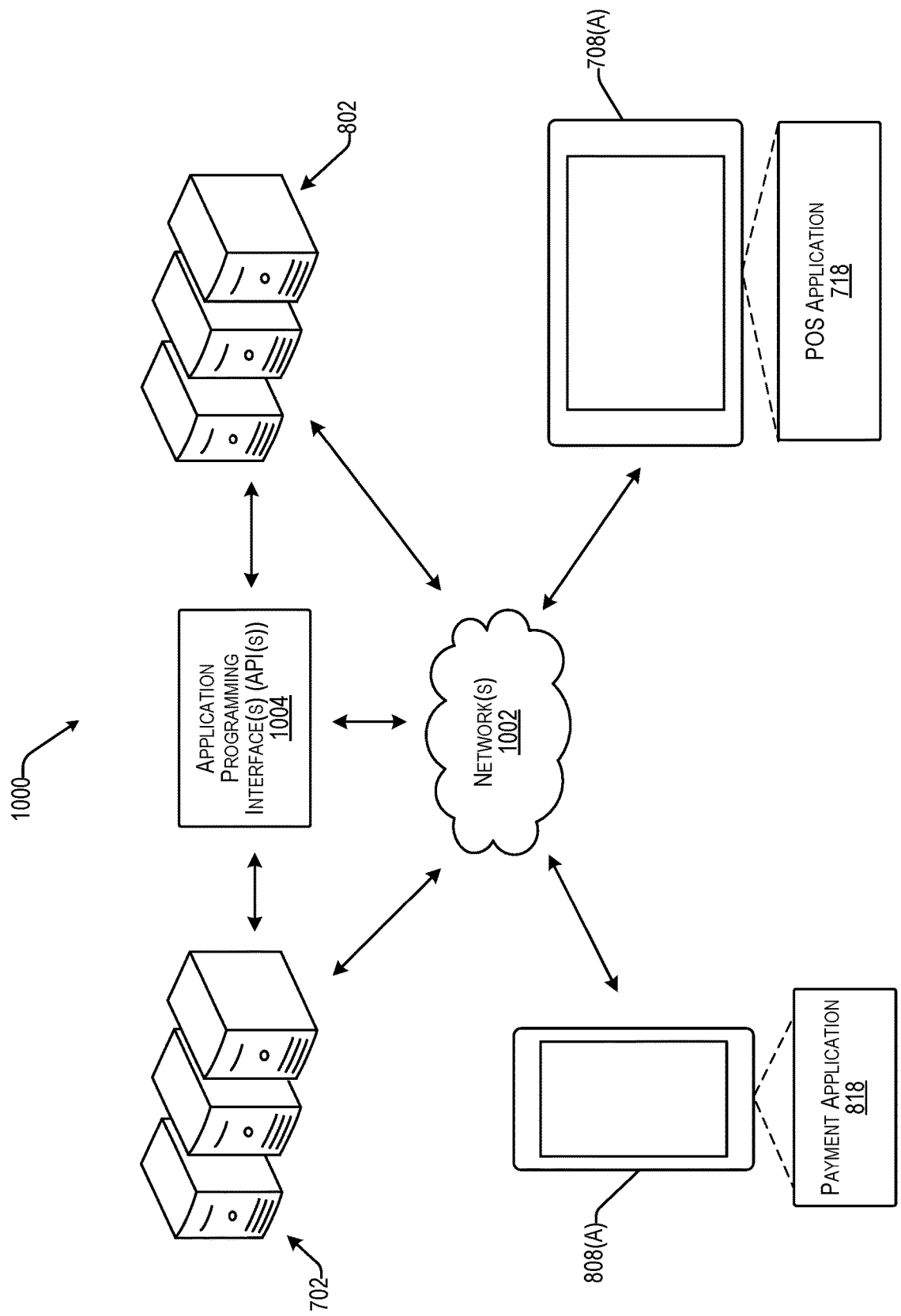
FIG. 10 illustrates an example integrated environment.

FIG. 10 illustrates an example integrated environment 1000 wherein the environment 700 and the environment 800 can be integrated to enable payments at the point-of-sale using assets associated with user accounts in the peer-to-peer environment of FIG. 8. As illustrated, each of the components can communicate with one another via one or more networks 1002. In some examples, one or more APIs 1004 or other functional components can be used to facilitate such communication.

In at least one example, the example environment 1000 can enable contactless payments, via integration of peer-to-peer payment, or other payment making, platform(s) and payment processing platform(s), are described herein. For the purpose of FIG. 10, the environment 700 can refer to a payment processing platform and the environment 800 can refer to a peer-to-peer payment, or payment making, platform. In an example, such an integration can enable a customer to participate in a transaction via their own computing device instead of interacting with a merchant device of a merchant, such as the merchant device 708(A). In such an example, the POS application 718, associated with a payment processing platform and executable by the merchant device 708(A) of the merchant, can present a Quick Response (QR) code, or other code that can be used to identify a transaction (e.g., a transaction code), in association with a transaction between the customer and the merchant. The QR code, or other transaction code, can be provided to the POS application 718 via an API associated with the peer-to-peer payment platform. In an example, the customer can utilize their own computing device, such as the user device 808(A), to capture the QR code, or the other transaction code, and to provide an indication of the captured QR code, or other transaction code, to server(s) 702 and/or server(s) 802.

Based at least in part on the integration of the peer-to-peer payment platform and the payment processing platform (e.g., via the API), the server(s) 702 and/or 802 associated with each can exchange communications with each other—and with a payment application 818 associated with the peer-to-peer payment platform and/or the POS application 718—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 808(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 718 and the payment application 818, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 808(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device.

In an example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 708(A) can present a QR code, or other transaction code, that can be associated with a peer-to-peer payment platform. The customer can use a camera associated with the user device 808(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 718, associated with a payment processing platform, on the merchant device 708(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 718 can cause a text message with a resource locator (e.g., uniform resource locator (URL)) that can be associated with a peer-to-peer payment platform to be sent to the user device 808(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 808(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 718 of a merchant device 708(A) at a brick-and-mortar store of a merchant to a payment application 818 of a user device 808(A) of a customer to enable the customer to participate in a transaction via their own computing device. For instance, in a "scan to pay" example as described above, based at least in part on capturing the QR code, or other transaction code, via the user device 808(A), the payment processing platform can provide transaction data to the peer-to-peer payment platform for presentation via the payment application 818 on the user device 808(A). In some examples, the customer can watch items being added to their cart (e.g., via a user interface presented via the payment application). As an item is added to a virtual cart by the merchant—via the POS application 718 on the merchant device 708(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 818 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 808(A) during or after payment of the transaction.

In some examples, based at least in part on capturing the QR code, or other transaction code, the payment processing platform can provide transaction data to the peer-to-peer payment platform for presentation via the payment application 818 on the computing device of the customer, such as the user device 808(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 818 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 718, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 818 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 11:
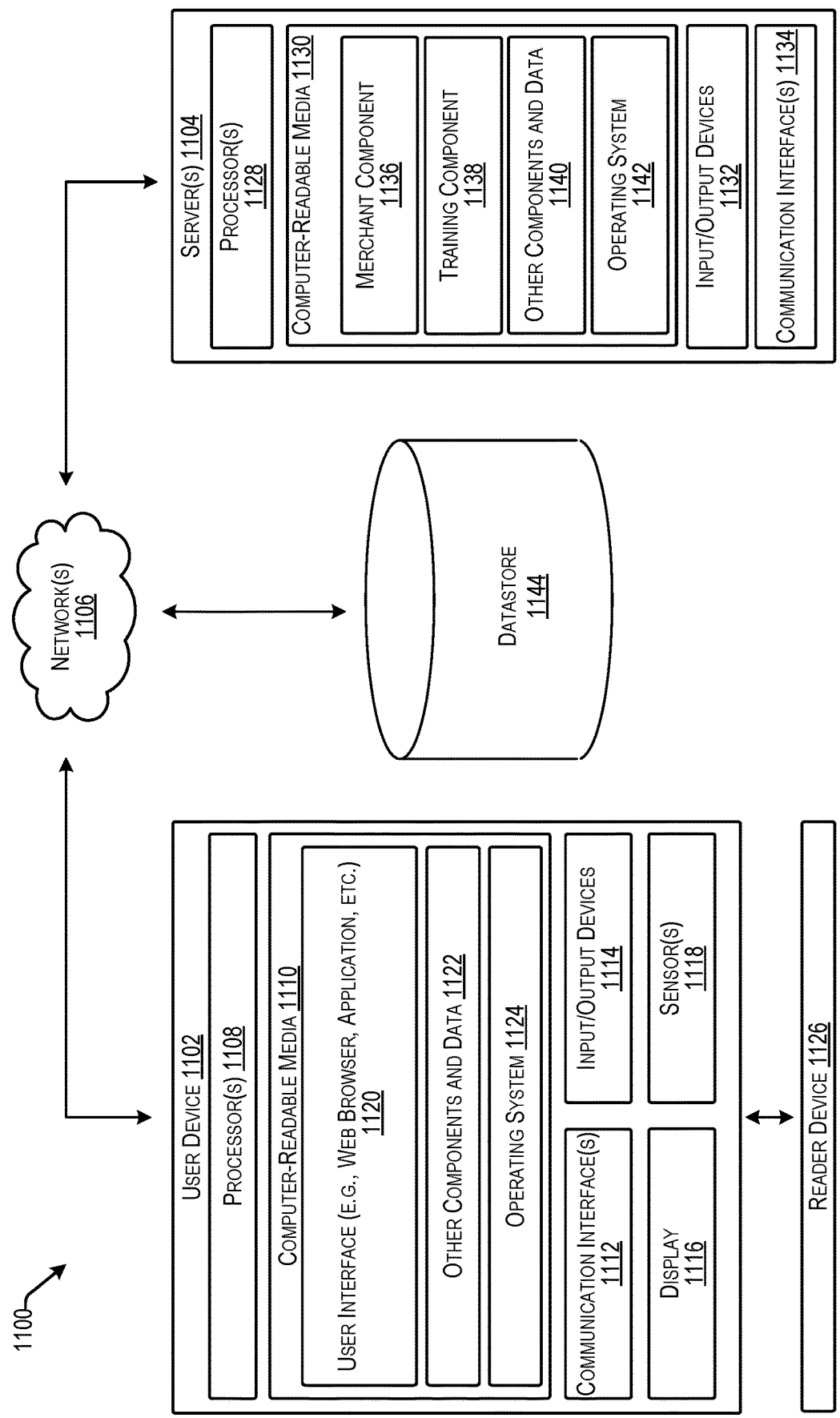
FIG. 11 depicts an illustrative block diagram illustrating a system for performing techniques described herein.

FIG. 11 depicts an illustrative block diagram illustrating a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 6.

The user device 1102 can be, for example, the mobile device 102 or the mobile device 142 of the system 100, shown in FIG. 1B. The servers 1104 can include, for example, the server 120 of the system 100.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 can include devices, e.g., payment card readers, or components capable of accepting payments, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1110 can include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, components or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 to enable users to interact with the user device 1102, and thus the server(s) 1104 and/or other networked devices. In at least one example, the user interface 1120 can be presented via a web browser, or the like. In other examples, the user interface 1120 can be presented via an application, such as a mobile application or desktop application, which can be provided by a service provider associated with the server(s) 1104, or which can be an otherwise dedicated application. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which may be treated in a manner similar to "direct" user input.

Depending on the type of the user device 1102, the computer-readable media 1110 can also optionally include other functional components and data, such as other components and data 1122, which can include programs, drivers, etc., and the data used or generated by the functional components. In addition, the computer-readable media 1110 can also store data, data structures and the like, that are used by the functional components. Further, the user device 1102 can include many other logical, programmatic, and physical components, of which those described are merely examples that are related to the discussion herein.

In at least one example, the computer-readable media 1110 can include additional functional components, such as an operating system 1124 for controlling and managing various functions of the user device 1102 and for enabling basic user interactions.

The communication interface(s) 1112 can include one or more interfaces and hardware components for enabling communication with various other devices, such as over the network(s) 1106 or directly. For example, communication interface(s) 1112 can enable communication through one or more network(s) 1106, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtually reality display, or any other display able to present and/or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. Alternatively, in some examples, the user device 1102 may not include the display 1116, and information can be presented by other means, such as aurally, haptically, etc.

In addition, the user device 1102 can include sensor(s) 1118. The sensor(s) 1118 can include a GPS device able to indicate location information. Further, the sensor(s) 1118 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1102 can include various other components that are not shown, examples of which include removable storage, a power source, such as a battery and power control unit, a barcode scanner, a printer, a cash drawer, and so forth.

In addition, in some examples, the user device 1102 can include, be connectable to, or otherwise be coupled to a reader device 1126, for reading payment instruments and/or identifiers associated with payment objects. In some examples, as described above, the reader device 1126 can plug in to a port in the user device 1102, such as a microphone port, a headphone port, an audio-jack, a data port, or other suitable port. In additional or alternative examples, the reader device 1126 can be coupled to the user device 1102 via another wired or wireless connection, such as via a Bluetooth®, BLE, and so on. The reader device 1126 can include a read head for reading a magnetic strip of a payment card, and further can include encryption technology for encrypting the information read from the magnetic strip. Additionally or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1126 may also include a biometric sensor to receive and process biometric characteristics and process them as payment instruments, given that such biometric characteristics are registered with the payment service and connected to a financial account with a bank server.

The reader device 1126 may include processing unit(s), computer-readable media, a reader chip, a transaction chip, a timer, a clock, a network interface, a power supply, and so on. The processing unit(s) of the reader device 1126 may execute one or more components and/or processes to cause the reader device 1126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1126, the computer-readable media may include volatile memory (such as RAM), non-volatile memory (such as ROM, flash memory, miniature hard drive, memory card, or the like), or some combination thereof. In at least one example, the computer-readable media of the reader device 1126 may include at least one component for performing various functions as described herein.

The reader chip may perform functionalities to control the operations and processing of the reader device 1126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1106, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1102, which can be a POS terminal, and the reader device 1126 are shown as separate devices, in additional or alternative examples, the user device 1102 and the reader device 1126 can be part of a single device, which may be a battery-operated device. In such an example, components of both the user device 1102 and the reader device 1126 may be associated with the single device. In some examples, the reader device 1126 can have a display integrated therewith, which can be in addition to (or as an alternative of) the display 1116 associated with the user device 1102.

The server(s) 1104 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1104 can include one or more processors 1128, one or more computer-readable media 1130, one or more I/O devices 1132, and one or more communication interfaces 1134. Each processor 1128 can be a single processing unit or a number of processing units, and can include single or multiple computing units or multiple processing cores. The processor(s) 1128 can be implemented as one or more microprocessors, microcomputers, microcontrollers, digital signal processors, central processing units, state machines, logic circuitries, and/or any devices that manipulate signals based on operational instructions. For example, the processor(s) 1128 can be one or more hardware processors and/or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 can include volatile and nonvolatile memory and/or removable and non-removable media implemented in any type of technology for storage of information, such as computer-readable instructions, data structures, program components, or other data. Such computer-readable media 1130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the service provider and/or payment processing service. Functional components stored in the computer-readable media 1130 can optionally include a merchant component 1136, a training component 1138, and one or more other components and data 1140.

The merchant component 1136 can be configured to receive transaction data from POS systems. The merchant component 1136 can transmit requests (e.g., authorization, capture, settlement, etc.) to payment service server computing device(s) to facilitate POS transactions between merchants and customers. The merchant component 1136 can communicate the successes or failures of the POS transactions to the POS systems.

The training component 1138 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1102 and/or the server(s) 1104 for use at a time after the data models have been trained (e.g., at runtime).

The one or more other components and data 1140 can include the server signing key 126 and the authenticator 128, the functionality of which is described, at least partially, above. Further, the one or more other components and data 1140 can include programs, drivers, etc., and the data used or generated by the functional components. Further, the server(s) 1104 can include many other logical, programmatic, and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1130 can additionally include an operating system 1142 for controlling and managing various functions of the server(s) 1104.

The communication interface(s) 1134 can include one or more interfaces and hardware components for enabling communication with various other devices, such as over the network(s) 1106 or directly. For example, communication interface(s) 1134 can enable communication through one or more network(s) 1106, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1132. Such I/O devices 1132 can include a display, various user interface controls (e.g., buttons, joystick, keyboard, mouse, touch screen, biometric or sensory input devices, etc.), audio speakers, connection ports and so forth.

In at least one example, the system 1100 can include a datastore 1144 that can be configured to store data that is accessible, manageable, and updatable. In some examples, the datastore 1144 can be integrated with the user device 1102 and/or the server(s) 1104. In other examples, as shown in FIG. 11, the datastore 1144 can be located remotely from the server(s) 1104 and can be accessible to the server(s) 1104. The datastore 1144 can comprise multiple databases and/or servers connected locally and/or remotely via the network(s) 1106.

In at least one example, the datastore 1144 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1144 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1144 can store additional or alternative types of data as described herein.

In addition to the embodiments described above, the following embodiments are also innovative:

Embodiment 1 is a method performed by a hardware wallet device, comprising: storing a first private key associated with a cryptocurrency address; operating in a normal mode, including: receiving, from a mobile device, a signature request for a transaction with the cryptocurrency address; in response to receiving the signature request, generating a first signature for the transaction using the first private key; transmitting the first signature to the mobile device, wherein the first signature and a second signature authenticate the transaction, the second signature being generated by the mobile device using a second private key stored by the mobile device; receiving a request from a user to enter an export mode; verifying an identity of the user; and in response to receiving the request and verifying the identity of the user, switching from operating in the normal mode to operating in the export mode; and operating in the export mode, including: receiving, from the mobile device, the second private key; generating a descriptor for the first private key and the second private key; and transmitting the descriptor for the first private key and the second private key to a second device, wherein the descriptor enables access to the cryptocurrency address.

Embodiment 2 is the method of embodiment 1, wherein the second device comprises the mobile device or a second hardware wallet device.

Embodiment 3 is the method of any one of embodiments 1 to 2, comprising verifying the identity of the user with biometric information provided to the hardware wallet device.

Embodiment 4 is the method of any one of embodiments 1 to 3, comprising, in the export mode: receiving, from the mobile device, authenticating information for the mobile device; authenticating the mobile device using the authenticating information; and generating the descriptor for the first private key and the second private key in response to authenticating the mobile device.

Embodiment 5 is the method of any one of embodiments 1 to 4, comprising, in the export mode: receiving the second private key from the mobile device by near field communication.

Embodiment 6 is the method of any one of embodiments 1 to 5, comprising, in the export mode: transmitting the descriptor for the first private key and the second private key to the mobile device by near field communication.

Embodiment 7 is the method of any one of embodiments 1 to 6, wherein operation in the export mode prohibits later operation in the normal mode.

Embodiment 8 is the method of any one of embodiments 1 to 7, comprising, in the normal mode: verifying an identity of a user of the hardware wallet device; and generating the first signature in response to verifying the identity of the user.

Embodiment 9 is the method of any one of embodiments 1 to 8, comprising, in the normal mode: receiving, from the mobile device, authenticating information for the mobile device; authenticating the mobile device using the authenticating information; and generating the first signature in response to authenticating the mobile device.

Embodiment 10 is a system comprising: one or more computers and one or more storage devices storing instructions that are operable, when executed by the one or more computers, to cause the one or more computers to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

Embodiment 12 is a method performed by a hardware wallet device, comprising: exporting a descriptor for a set of cryptographic keys including a first cryptographic key and a second cryptographic key, wherein the descriptor enables access to a blockchain address, including: storing the first cryptographic key, wherein a first signature generated from the first cryptographic key partially authenticates transactions with the cryptocurrency address; receiving, through wireless communications, the second cryptographic key, wherein a second signature generated from the second cryptographic key partially authenticates transactions with the cryptocurrency address; generating the descriptor for the set of cryptographic keys; and outputting the descriptor for the set of cryptographic keys.

Embodiment 13 is the method of embodiment 12, comprising receiving the second cryptographic key from a mobile device.

Embodiment 14 is the method of any one of embodiments 12 to 13, wherein outputting the descriptor for the set of cryptographic keys comprises transmitting the descriptor to the mobile device by near field communication.

Embodiment 15 is the method of any one of embodiments 12 to 14, comprising: receiving, from the mobile device, authenticating information for the mobile device; authenticating the mobile device using the authenticating information; and generating the descriptor for the set of cryptographic keys in response to authenticating the mobile device.

Embodiment 16 is the method of any one of embodiments 12 to 15, wherein outputting the descriptor for the set of cryptographic keys comprises transmitting the descriptor to a second hardware wallet device.

Embodiment 17 is the method of any one of embodiments 12 to 16, comprising: receiving a request from a user to export the descriptor for the set of cryptographic keys;

verifying an identity of the user with biometric information provided to a biometric sensor of the hardware wallet device; and in response to receiving the request and verifying the identity of the user, exporting the descriptor for the set of cryptographic keys.

Embodiment 18 is the method of any one of embodiments 12 to 17, wherein receiving the request from the user to export the descriptor for the set of cryptographic keys comprises: detecting a user interaction with a biometric sensor of the hardware wallet device; and determining that a pattern of the user interaction with the biometric sensor of the hardware wallet device satisfies criteria for indicating the request to export the descriptor for the set of cryptographic keys.

Embodiment 19 is the method of any one of embodiments 12 to 18, wherein receiving, through wireless communication, the second cryptographic key comprises receiving the second cryptographic key by near field communication.

Embodiment 20 is the method of any one of embodiments 12 to 19, wherein the first signature generated from the first cryptographic key and the second signature generated from the second cryptographic key fully authenticate transactions with the cryptocurrency address.

Embodiment 21 is a system comprising: one or more computers and one or more storage devices storing instructions that are operable, when executed by the one or more computers, to cause the one or more computers to perform the method of any one of embodiments 12 to 20.

Embodiment 22 is a computer storage medium encoded with a computer program, the program comprising instructions that are operable, when executed by data processing apparatus, to cause the data processing apparatus to perform the method of any one of embodiments 12 to 20.

Embodiment 23 is a method for managing access to cryptocurrency assets, comprising: protecting cryptocurrency assets using a first security protocol in which signatures generated from multiple cryptographic keys are required to access a cryptocurrency address, wherein each of the multiple cryptographic keys are stored by one of a plurality of computing devices; receiving a user request to exit the first security protocol; authenticating the user request to exit the first security protocol; and in response to authenticating the user request, exiting the first security protocol, including transporting a descriptor for the multiple cryptographic keys to a single one of the plurality of computing devices, wherein the descriptor enables access to the cryptocurrency address.

Embodiment 24 is the method of embodiment 23, wherein: the multiple cryptographic keys include a first cryptographic key stored by a first computing device of the plurality of computing devices and a second cryptographic key stored by a second computing device of the plurality of computing devices, and transporting the descriptor for the multiple cryptographic keys to a single one of the plurality of computing devices comprises: receiving, by the second computing device and from the first computing device, the first cryptographic key; generating, by the second computing device, a descriptor for the first cryptographic key and the second cryptographic key; and transmitting the descriptor for the first cryptographic key and the second cryptographic key to the first computing device.

Embodiment 25 is a system comprising: one or more computers and one or more storage devices storing instructions that are operable, when executed by the one or more computers, to cause the one or more computers to perform the method of any one of embodiments 23 to 24.

Embodiment 26 is a computer storage medium encoded with a computer program, the program comprising instructions that are operable, when executed by data processing apparatus, to cause the data processing apparatus to perform the method of any one of embodiments 23 to 24.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The invention claimed is:

1. A method performed by a hardware wallet device, the method comprising:

storing a first cryptographic key, wherein a set of cryptographic keys includes the first cryptographic key and a second cryptographic key, wherein a first signature generated from the first cryptographic key partially authenticates transactions with a blockchain address;

receiving a request from a user to export a descriptor for the set of cryptographic keys;

detecting a user interaction with a biometric sensor of the hardware wallet device;

determining that a pattern of the user interaction with the biometric sensor of the hardware wallet device satisfies a criterion for indicating the request to export the descriptor for the set of cryptographic keys;

obtaining, through one or more wireless communications, the second cryptographic key, wherein a second signature generated from the second cryptographic key partially authenticates the transactions with the blockchain address;

generating the descriptor for the set of cryptographic keys, wherein the descriptor enables access to the blockchain address by enabling a set of signatures to be generated to authenticate a transaction with the blockchain address; and outputting the descriptor for the set of cryptographic keys to export the descriptor, wherein outputting the descriptor is responsive to determining that the pattern satisfies the criterion.

2. The method of claim 1, wherein obtaining the second cryptographic key includes obtaining the second cryptographic key from a mobile device.

3. The method of claim 2, further comprising:
determining that the hardware wallet device and the mobile device are both in an export mode, wherein obtaining the second cryptographic key from the mobile device is responsive to determining that the hardware wallet device and the mobile device are both in the export mode.

4. The method of claim 1, wherein outputting the descriptor for the set of cryptographic keys includes transmitting the descriptor to a mobile device using near field communication.

5. The method of claim 2, further comprising:
receiving, from the mobile device, authenticating information for the mobile device;
authenticating the mobile device using the authenticating information; and
generating the descriptor for the set of cryptographic keys in response to authenticating the mobile device.

6. The method of claim 1, wherein outputting the descriptor for the set of cryptographic keys includes transmitting the descriptor to a second hardware wallet device.

7. The method of claim 1, further comprising:
verifying an identity of the user, wherein exporting the descriptor for the set of cryptographic keys is responsive to receiving the request and verifying the identity of the user.

8. The method of claim 7, wherein verifying the identity of the user is based on biometric information from the biometric sensor of the hardware wallet device.

9. The method of claim 7, further comprising:
transitioning from a first mode to a second mode in response to receiving the request and verifying the identity of the user, wherein the request is received and the identity of the user is verified while the first mode is active, and wherein the descriptor is exported while the second mode is active.

10. The method of claim 9, wherein the first signature and the second signature are required to access to the blockchain address while the first mode is active.

11. The method of claim 1, wherein obtaining, through the one or more wireless communications, the second cryptographic key includes receiving the second cryptographic key using near field communication.

12. The method of claim 1, wherein the first signature and the second signature fully authenticate the transactions with the blockchain address.

13. The method of claim 1, wherein the first cryptographic key is a first private key, and wherein the second cryptographic key is a second private key.

14. The method of claim 1, further comprising:
generating the first signature using the first cryptographic key, wherein the second signature is generated by a mobile device using the second cryptographic key.

15. The method of claim 1, wherein the set of signatures includes the first signature and the second signature.

16. The method of claim 1, further comprising:
generating the first signature using the first cryptographic key.

17. The method of claim 1, further comprising:
receiving, from a mobile device, authenticating information for the mobile device;
authenticating the mobile device using the authenticating information; and
generating the first signature using the first cryptographic key in response to authenticating the mobile device.

18. The method of claim 1, wherein the descriptor is a token.

19. A system comprising:
a memory storing instructions; and
a processor, wherein execution of the instructions by the processor causes the processor to:
store a first cryptographic key, wherein a set of cryptographic keys includes the first cryptographic key and a second cryptographic key, wherein a first signature generated from the first cryptographic key partially authenticates transactions with a blockchain address;
receive a request from a user to export a descriptor for the set of cryptographic keys;
detect a user interaction with a biometric sensor of a hardware wallet device;
determine that a pattern of the user interaction with the biometric sensor of the hardware wallet device satisfies a criterion for indicating the request to export the descriptor for the set of cryptographic keys;
obtain, through one or more wireless communications, the second cryptographic key, wherein a second signature generated from the second cryptographic key partially authenticates the transactions with the blockchain address;
generate the descriptor for the set of cryptographic keys, wherein the descriptor enables access to the blockchain address by enabling a set of signatures to be generated to authenticate a transaction with the blockchain address; and
output the descriptor for the set of cryptographic keys to export the descriptor, wherein outputting the descriptor is responsive to determining that the pattern satisfies the criterion.

20. The system of claim 19, further comprising:
the biometric sensor of the hardware wallet device, wherein the hardware wallet device includes the memory and the processor.

21. The system of claim 19, further comprising:
the hardware wallet device.

22. The system of claim 19, wherein obtaining the second cryptographic key includes obtaining the second cryptographic key from a mobile device.

23. The system of claim 22, further comprising:
the mobile device.

24. The system of claim 19, wherein outputting the descriptor for the set of cryptographic keys includes transmitting the descriptor to a mobile device using near field communication.

25. The system of claim 19, wherein outputting the descriptor for the set of cryptographic keys includes transmitting the descriptor to a second hardware wallet device.

26. The system of claim 19, wherein obtaining, through the one or more wireless communications, the second cryptographic key includes receiving the second cryptographic key using near field communication.

27. The system of claim 19, wherein the first cryptographic key is a first private key, and wherein the second cryptographic key is a second private key.

28. The system of claim 19, wherein the execution of the instructions by the processor causes the processor to:
generate the first signature using the first cryptographic key, wherein the second signature is generated by a mobile device using the second cryptographic key.

29. The system of claim 19, wherein the execution of the instructions by the processor causes the processor to:
generate the first signature using the first cryptographic key, wherein the set of signatures includes the first signature and the second signature.

30. The system of claim 19, wherein the execution of the instructions by the processor causes the processor to:
receive, from a mobile device, authenticating information for the mobile device;
authenticate the mobile device using the authenticating information; and
generate the first signature using the first cryptographic key in response to authenticating the mobile device.

31. The system of claim 19, wherein the descriptor is a token.

* * * * *